United States Patent
Harrison et al.

(10) Patent No.: US 8,280,099 B2
(45) Date of Patent: Oct. 2, 2012

(54) LASER SAFETY SYSTEM WITH BEAM STEERING

(75) Inventors: Michael Harrison, Chillicothe, OH (US); Joseph D. Ferrario, Ann Arbor, MI (US); Ashot Mesropyan, Circleville, OH (US)

(73) Assignee: Telesis Technologies, Inc., Circleville, OH (US)

( * ) Notice: Subject to any disclaimer, the term of this patent is extended or adjusted under 35 U.S.C. 154(b) by 1029 days.

(21) Appl. No.: 12/247,469

(22) Filed: Oct. 8, 2008

(65) Prior Publication Data
US 2009/0040299 A1    Feb. 12, 2009

Related U.S. Application Data

(62) Division of application No. 11/796,546, filed on Apr. 27, 2007, now Pat. No. 7,676,061.

(60) Provisional application No. 60/797,102, filed on May 2, 2006.

(51) Int. Cl.
*G06K 9/00* (2006.01)
*A61B 18/18* (2006.01)

(52) U.S. Cl. .......................... 382/100; 606/11
(58) Field of Classification Search ................ 606/4–12, 606/17
See application file for complete search history.

(56) References Cited

U.S. PATENT DOCUMENTS

| | | | | |
|---|---|---|---|---|
| 3,782,832 A | * | 1/1974 | Hacskaylo | 356/153 |
| 4,349,838 A | * | 9/1982 | Daniel | 348/169 |
| 4,438,765 A | | 3/1984 | Wilinsky | 606/4 |
| 4,618,759 A | * | 10/1986 | Muller et al. | 219/121.75 |
| 4,659,916 A | * | 4/1987 | Muller et al. | 250/203.1 |
| 4,668,088 A | * | 5/1987 | Quinque et al. | 356/138 |
| 4,675,501 A | * | 6/1987 | Klingel | 219/121.67 |
| 4,724,298 A | | 2/1988 | Hawkins et al. | |
| 4,727,234 A | * | 2/1988 | Oprysko et al. | 219/121.6 |
| 4,855,564 A | * | 8/1989 | Hawkins et al. | 219/121.78 |
| 4,972,498 A | * | 11/1990 | Leib | 382/211 |
| 5,018,936 A | * | 5/1991 | Izumi et al. | 198/395 |
| 5,055,926 A | * | 10/1991 | Christensen et al. | 348/172 |
| 5,066,294 A | * | 11/1991 | Cosmescu | 606/11 |
| 5,109,345 A | * | 4/1992 | Dabney et al. | 701/3 |
| H1060 H | * | 5/1992 | Lazich | 382/134 |
| 5,305,074 A | * | 4/1994 | Feldman | 356/512 |
| 5,459,570 A | * | 10/1995 | Swanson et al. | 356/479 |
| 5,484,571 A | * | 1/1996 | Pentoney et al. | 422/82.08 |

(Continued)

OTHER PUBLICATIONS

International Search Report and Written Opinion issued Sep. 11, 2008 for PCT/US07/10336.

*Primary Examiner* — Manav Seth
(74) *Attorney, Agent, or Firm* — David H. Jaffer; Pillsbury Winthrop Shaw Pittman LLP

(57) ABSTRACT

A laser safety system providing a system for checking the presence, focus and integrity of a laser beam focusing lens is disclosed. The laser safety system checks the focusing lens properties by capturing an image of a target by viewing the target through the focusing lens from along the laser beam path. An initial, known good, image is compared to an image captured immediately before enablement of the laser beam source to determine if the focusing lens is present, focused and is not damaged. The system may also utilize a mask projected onto the target as well as a low-power visible light laser directed along the path of the processing laser to determine the focusing lens properties. The system can also provide target recognition.

9 Claims, 23 Drawing Sheets

U.S. PATENT DOCUMENTS

| | | | |
|---|---|---|---|
| 5,519,432 A * | 5/1996 | Genovese | 347/260 |
| 5,588,430 A * | 12/1996 | Bova et al. | 600/429 |
| 5,627,360 A * | 5/1997 | Rudeen | 235/462.21 |
| 5,638,396 A * | 6/1997 | Klimek | 372/92 |
| 5,646,394 A * | 7/1997 | Steinle et al. | 250/208.1 |
| 5,673,082 A * | 9/1997 | Wells et al. | 348/139 |
| 5,684,531 A * | 11/1997 | Li et al. | 348/139 |
| 5,724,138 A * | 3/1998 | Reich et al. | 356/492 |
| 5,751,423 A * | 5/1998 | Traina et al. | 356/338 |
| 5,757,480 A | 5/1998 | Shimanaka | |
| 5,768,137 A * | 6/1998 | Polidoro et al. | 700/186 |
| 5,784,431 A * | 7/1998 | Kalend et al. | 378/65 |
| 5,878,072 A * | 3/1999 | Greisz | 372/103 |
| 5,981,965 A * | 11/1999 | Pryor et al. | 250/559.23 |
| 6,303,903 B1 | 10/2001 | Liu | 219/121.83 |
| 6,421,573 B1 | 7/2002 | Kafka et al. | |
| 6,590,182 B1 * | 7/2003 | Domae | 219/121.69 |
| 6,807,740 B2 * | 10/2004 | Reed et al. | 33/286 |
| 6,812,462 B1 * | 11/2004 | Toth et al. | 850/1 |
| 6,951,627 B2 * | 10/2005 | Li et al. | 264/400 |
| 7,064,817 B1 * | 6/2006 | Schmitt et al. | 356/139.03 |
| 7,289,736 B1 * | 10/2007 | Graves | 398/119 |
| 7,542,492 B2 * | 6/2009 | Bhatia | 372/29.014 |
| 7,548,323 B2 * | 6/2009 | Lizotte | 356/600 |
| 2002/0097378 A1 * | 7/2002 | Saito et al. | 351/206 |
| 2003/0058917 A1 | 3/2003 | Benderly | 372/103 |
| 2004/0059321 A1 * | 3/2004 | Knopp et al. | 606/10 |
| 2005/0005642 A1 | 1/2005 | Kaplan et al. | 63/32 |
| 2007/0018099 A1 * | 1/2007 | Chitturi et al. | 250/310 |
| 2007/0173792 A1 | 7/2007 | Arnoldussen | 606/4 |

* cited by examiner

LASER SAFETY SYSTEM WITH BEAM STEERING

RELATED APPLICATIONS

The present invention is a divisional of U.S. patent application Ser. No. 11/796,546 filed Apr. 27, 2007 now U.S. Pat. No. 7,676,061, which claims priority from U.S. Provisional Patent Application Ser. No. 60/797,102 filed May 2, 2006, which are incorporated herein by reference.

BACKGROUND OF THE INVENTION

1. Field of the Invention

The present invention relates generally to safety systems for lasers, and more particularly to a method and apparatus for testing laser beam focus and beam alignment prior to operating the laser system, and for taking a safety action if the system is not in proper working condition.

2. Brief Description of the Prior Art

Many types of laser-based devices and systems, having a wide range of applications in fields such as manufacturing, research, communications and medicine have become increasingly well-known and commercially available. The lasers used in many of these devices and systems are often capable of producing energy output that is potentially harmful to both people and equipment.

The potential dangers associated with lasers are several. For example, burns to the skin and clothing or even to nearby equipment, walls or other objects may be sustained if exposed to laser radiation of sufficient energy and for sufficient duration. Further, some forms of laser radiation can damage an unprotected human eye even before it has time to react to the exposure. This may lead to considerable physical damage to the eye, such as cutting or burning, and can also result in temporary or permanent vision impairment or blindness. Depending on the energy, wavelength and focus of the laser radiation, these dangers may be minimal unless the object comes within a few inches of the laser source. At other focal lengths however, the laser radiation may be harmful even at long distances from the source.

Another potential danger associated with lasers is that of chemical vapors, dust or melted liquids that may be formed in the area where the laser interacts with a work surface, such as in laser welding or scribing. The harmful properties of these chemicals may adversely affect nearby persons if inhaled or otherwise transferred to the body.

Because of the potential dangers associated with lasers, a variety of safety devices have been devised to promote safe operation of laser-based equipment. Common forms of safety equipment include items such as safety goggles, workstation enclosures and warning labels, as well as more complex mechanical interlocks and shutter systems designed to disable the laser when safety sensors are triggered. Other systems have been designed to detect and disable rogue laser beams that are reflected, scattered, aimed or otherwise impinge on walls of a room or enclosure containing the laser equipment. One such system includes infrared monitoring of the walls and ceiling to detect heating of the surfaces by stray laser energy. Another system utilizes fluid-filled walls to detect when stray laser energy melts through an enclosure wall allowing the fluid to escape.

Standards have been established to require at least a minimum level of knowledge regarding the safe operation of a laser system to be passed on to a purchaser of such a system. Examples of such standards are those required by the U.S. Department of Health and Human Services Center for Devices and Radiological Health. These standards classify laser products on the basis of the highest level of laser radiation to which human access is possible during operation. Under this system, a class rating I through IV is assigned to denote the risk involved. A Class I system provides the least risk and is one that emissions in the ultraviolet, visible and infrared spectra are at levels below established biological hazard levels. Class II systems are considered a hazard for direct long-term ocular exposure. Class III system emission levels are ocular hazards for direct exposure and may be hazardous to skin at longer exposure times. Class IV systems are the most hazardous and pose a danger to eyes and skin upon direct, as well as indirect exposure such as that resulting from scattered, diffused or reflected radiation.

Ideally, all laser based systems would be operated under a Class I rating in a manner providing the greatest safety to operators and bystanders as well as to nearby equipment and the facility which houses the laser. However, for reasons such as costs and performance requirements, laser systems are often operated at more dangerous classification levels. For example, providing a sealed enclosure for a laser system inside which the laser operation takes place may represent the safest scenario, but may be impractical due to cost and size where the laser system and work piece are large. Further, portable laser systems, by their very nature, may not function optimally with the safety systems available in the art. One instance of this is where a portable laser is used to repair welds on a large, complex structure such as a building. Due to the size of the structure an enveloping enclosure is not feasible. In instances where the laser is to be used on surfaces that are generally planar or have a generally uniform surface topography, a shroud could be utilized to enclose the beam and engage the work piece, thereby preventing escape of harmful radiation. In contrast, where the surface has numerous features such a shroud would be ineffective, because it would be difficult or impossible to sufficiently conform the shroud to the work piece.

Another problem in a laser system is the difficulty in determining the direction in which invisible laser radiation is aimed and what it is striking. Current positioning systems used to direct the laser beam may use gantry systems that move in an X-Y plane, galvanometers, and robotic arms to steer the beam. It may be difficult with these systems to determine if the beam is always aimed at, and focused on, the desired target. If a laser beam is not aimed properly, it may be reflected or scattered off of the target and strike somewhere else, potentially causing damage. Further, if the desired target is misaligned, has a hole in it or is missing altogether, damage to equipment and/or personnel could occur.

Yet another possible hazard derives from the laser system itself. Lasers usually utilize a lens to focus the beam such that the focal point, and greatest intensity, of the beam is located on the surface of the work piece. If the focusing lens is missing or damaged in some way the beam may be unfocused and scattered, refracted or reflected to some other unspecified target. For example, before reaching the focusing lens, laser beams generally have a low divergence and are often expanded with a telescope to lower the divergence even further. Low divergence allows the beam to travel much greater distances before the beam energy becomes too dispersed to cause damage. By placing a focusing lens in the path of the beam the distance the beam must propagate before becoming harmless is greatly diminished.

SUMMARY

Briefly, an embodiment of the present invention includes a laser safety system including an apparatus for testing system laser beam alignment and focus, and for providing a safety action, including a notice, or disabling the system laser source if the laser is not directed at a designated target area, or if the focusing apparatus is not in proper operating condition. For testing system alignment, a plurality of light signal emitters positioned around a target area and communicate with a corresponding plurality of light detectors positioned on a laser steering apparatus. The detector outputs are compared by a controller with a reference to determine if the system is aligned so as to direct the laser correctly. For checking system focus, a camera is positioned to detect a target image and output image data to the controller for comparing with an image reference to determine focus. If either the laser direction or system focus exceeds a pre-determined error, the controller provides a notice and/or disables the laser.

A laser safety system according to the present invention provides a system that is utilized to determine the presence, integrity and focus of a laser focusing lens before a laser system is enabled. The system increases the safety of people and objects that may be contacted by laser radiation that is misdirected toward them due to missing, damaged or unfocused laser focusing lenses by reducing the risk thereof. The laser safety system can also identify missing or damaged beam steering mirrors or devices, and may also be employed to provide target recognition.

According to another embodiment of the present invention, the system may utilize either, or both of a group of signal sensors and signal sources, or cameras and visual targets to ensure accurate alignment of a beam steering device within a predetermined safe zone before enabling the laser beam. The system may assist in obtaining a less stringent safety class rating for laser systems by decreasing the risk of harm or damage to people and objects.

An object of the present invention is to provide a laser safety system for determining the operability of a focusing lens including its presence, integrity and focus, by analyzing the appearance of a target area in an image.

Another object of the present invention is to provide a laser safety system having a low-power visible light laser directed along a processing laser beam's path through the focusing lens to produce a figure on a target, and a controller to determine the operability of a laser focusing lens by analyzing the characteristics of the figure.

Yet another object of the present invention is to provide a laser safety system having a mask pattern projected onto a target by a light source, and wherein an image of the mask pattern is captured through a focusing lens by a camera, wherein characteristics of the mask pattern on the target as observed in the image are analyzed to determine the operability of the focusing lens.

Another object of the present invention is to provide a method for indicating the safe operability of a laser beam focusing lens, including the steps of capturing an initial image of a laser beam target through a laser beam focusing lens when the focusing lens is in focus, is in good condition and is present; capturing a second image of the laser beam target as seen through the laser beam focusing lens prior to beginning a laser processing operation; and comparing the second image and the initial image, wherein the laser system is enabled when the second image and the initial image match within a predetermined margin for error, and when the initial image and the second image do not match, the laser system is disabled and a perceivable visual or audible alarm is produced.

Another object of the present invention is to provide a method for indicating the safe operability of a laser beam focusing lens in which a low-power visible light laser beam is projected through a laser beam focusing lens and onto a target, wherein the figure projected by the low-power visible light laser beam onto the target area is observed and a processing laser beam is enabled when the characteristics of the projected figure meet predetermined specifications, and wherein the processing laser beam is disabled when the characteristics of the projected figure do not meet predetermined specifications, and in such a case a visual or audibly perceptible alarm is produced.

Another object of the present invention is to provide a method for indicating the safe operability of a laser beam focusing lens wherein a mask pattern is projected onto a laser beam target from a light source other than the processing laser, and wherein an initial image of the masked target is captured through the laser beam focusing lens when the focusing lens is in focus, in good condition and present, and wherein a second image of the masked target as seen through the laser beam focusing lens is captured before beginning a laser processing operation, and wherein the images are compared and the laser system enabled when the second image and the initial image match within a predetermined margin for error or disabled when the second image and the initial image do not match within a predetermined margin for error, and wherein if the laser system is disabled a visually or audibly perceivable alarm is produced.

An object of the present invention is to provide a laser positioning safety system including a beam steering device, a work surface, at least one signal source, and at least one signal sensor, wherein the signal sources and signal sensors are associated with the beam steering device and the work surface in a signal sensing orientation, and wherein a signal produced by the signal sources is detected by the signal sensors when the beam steering device is positioned within a safety zone for laser processing, and wherein the detection of the signal indicates that the beam steering device is oriented to allow safe operation of the laser system.

Another object of the present invention is to provide a laser positioning safety system including at least one camera, at least one visual target, at least one image of the visual targets, a beam steering device, and a work surface, wherein the camera is associated with the beam steering device and the visual targets are associated with the work surface, and wherein the camera captures at least one image of the visual targets, and wherein the images are utilized to indicate whether the beam steering device is positioned within a safety zone for laser processing by determining whether the visual targets in the images are in a predetermined safe orientation, and wherein the determination may indicate that the beam steering device is oriented to allow safe operation of the laser system Another object of the present invention is to provide a method for safely positioning a laser system including the steps of determining a safe orientation of a beam steering device for laser processing and associating a plurality of signal sources and signal sensors with the beam steering device and a work surface in a signal sensing orientation, wherein the method further includes the steps of orienting the beam steering device such that the signal sensors may detect a signal from their respective signal sources when the laser beam steering device is in the predetermined safe orientation, and detecting the signal from the signal sources by the signal sensors, and wherein a laser system is enabled when all of the signal sensors detect signals from their respective signal sources, or disabled when less than all of the signal sensors detect signals from their respective signal sources and a perceivable alarm is produced when the laser system is disabled.

Another object of the present invention is to provide a method for safely positioning a laser system including the steps of determining a safe orientation of a beam steering device for laser processing and associating at least one visual target and at least one camera with the beam steering device and a work surface, where the beam steering device is positioned in the predetermined safe orientation, an initial image of the visual targets is captured with the camera while the beam steering device is in the predetermined safe orientation, and a new image is captured before laser processing begins. The new image and the initial image are compared, and based on the comparison the laser system is enabled when the new image matches the initial image within a predetermined margin for error or disabled when the new image does not match the initial image within the predetermined margin for error.

IN THE DRAWINGS

Figure 19:
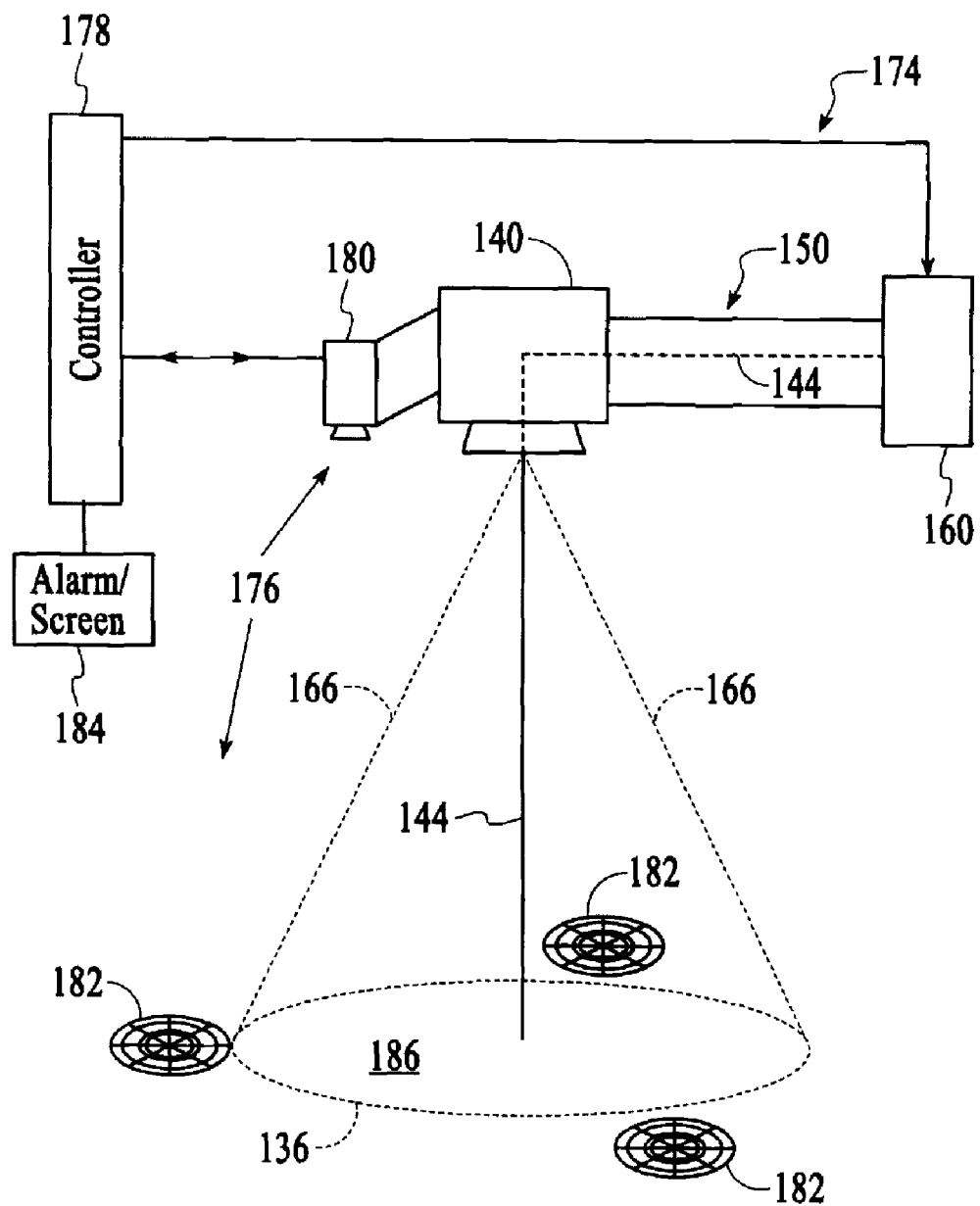
FIG. 19 is a side view schematic of a laser system depicting the general arrangement of a beam steering device with an associated camera and visual targets according to another embodiment of the present invention.
Figure 22:
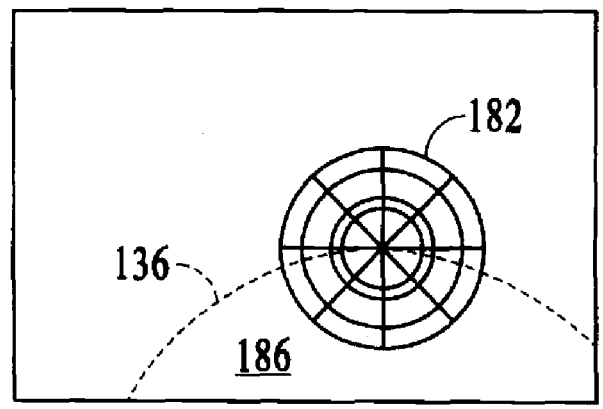
Figure 23:
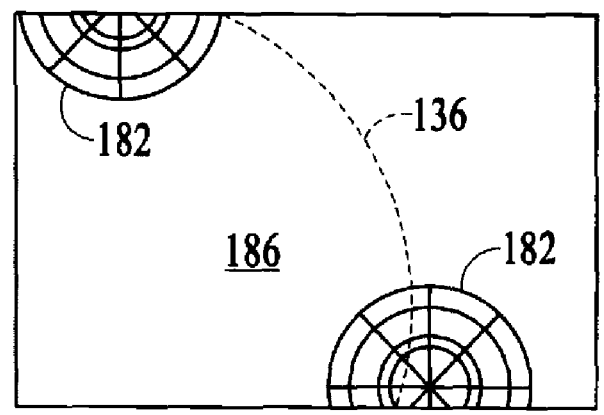

FIG. 22 is an example image depicting an image of visual targets that may be captured by the camera of the laser system of FIG. 19 indicating that a beam steering device is not properly oriented within a safety zone; and FIG. 23 is an example image depicting an image of visual targets that may be captured by the camera of the laser system of FIG. 19 indicating that a beam steering device is not properly oriented within a safety zone.

DETAILED DESCRIPTION OF THE INVENTION

Figure 1:
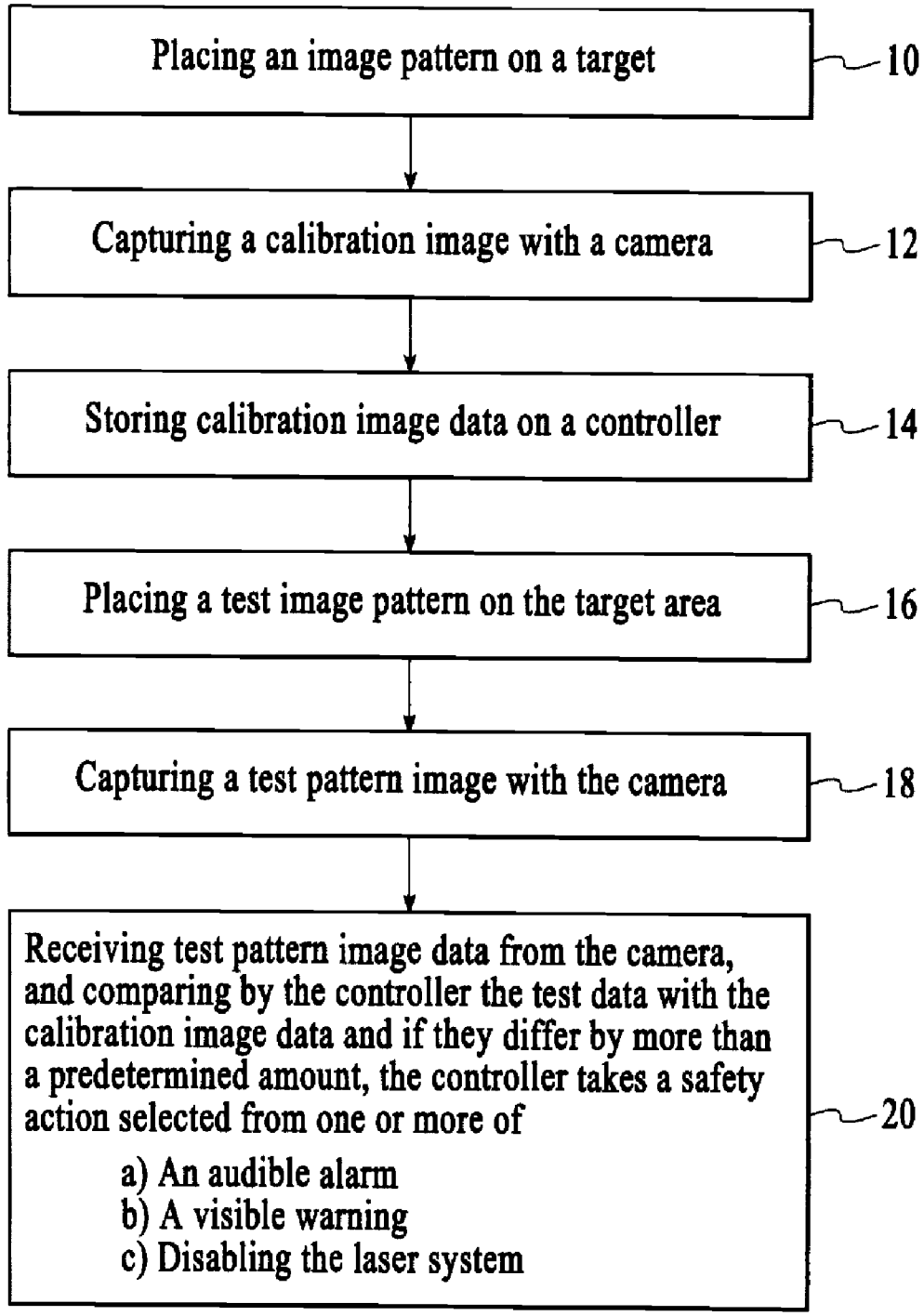
FIG. 1 is a method flow chart of an embodiment of the present invention describing use of a camera and image pattern to determine if a laser path is in working condition.

A method of the present invention is illustrated generally in reference to FIG. 1 of the drawing. A safety system is described for the purpose of reducing the possibility of a laser beam being misdirected and causing damage to persons or property. According to block 10, a calibration image pattern is placed on a target area of a laser system. The term "image pattern" will refer to any form of visible pattern, including a printed or scribed pattern, picture, etc. The image pattern can also be a non-material image, such as a projected light image for example. The adjective "calibration" in "calibration image pattern" is used to indicate that at this point in the method, the system has been determined to be in acceptable working condition, and the image data to be collected at this point referred to as image calibration data is to be used as a reference for future image data, termed "test data" or "image test data" taken prior to operation of the system. The calibration procedure then continues according to block 12, wherein a camera is then used to capture an image of the pattern when the laser system is in good operating condition, and stores for or transfers to a controller, corresponding image data. The image calibration data is then received and stored by a system controller (block 14). Prior to actually operating the laser system, the image pattern is again placed at the target area (block 16), and the camera captures an image, termed a "test image" (block 18). The system controller then compares the calibration image data with the test image data (block 20), and if they differ by more than a pre-determined amount, the controller takes a safety action. The safety action in one embodiment is an audible alarm to notify a user that the system is out of calibration. In another embodiment, the action is a visible notice, such as on a computer screen. In still another embodiment, the action is to disable the system laser source so that an attempt to operate the laser would fail. In another embodiment the action could be any combination of these described actions, or other action that would notify a user of the condition of the system.

Figure 2:
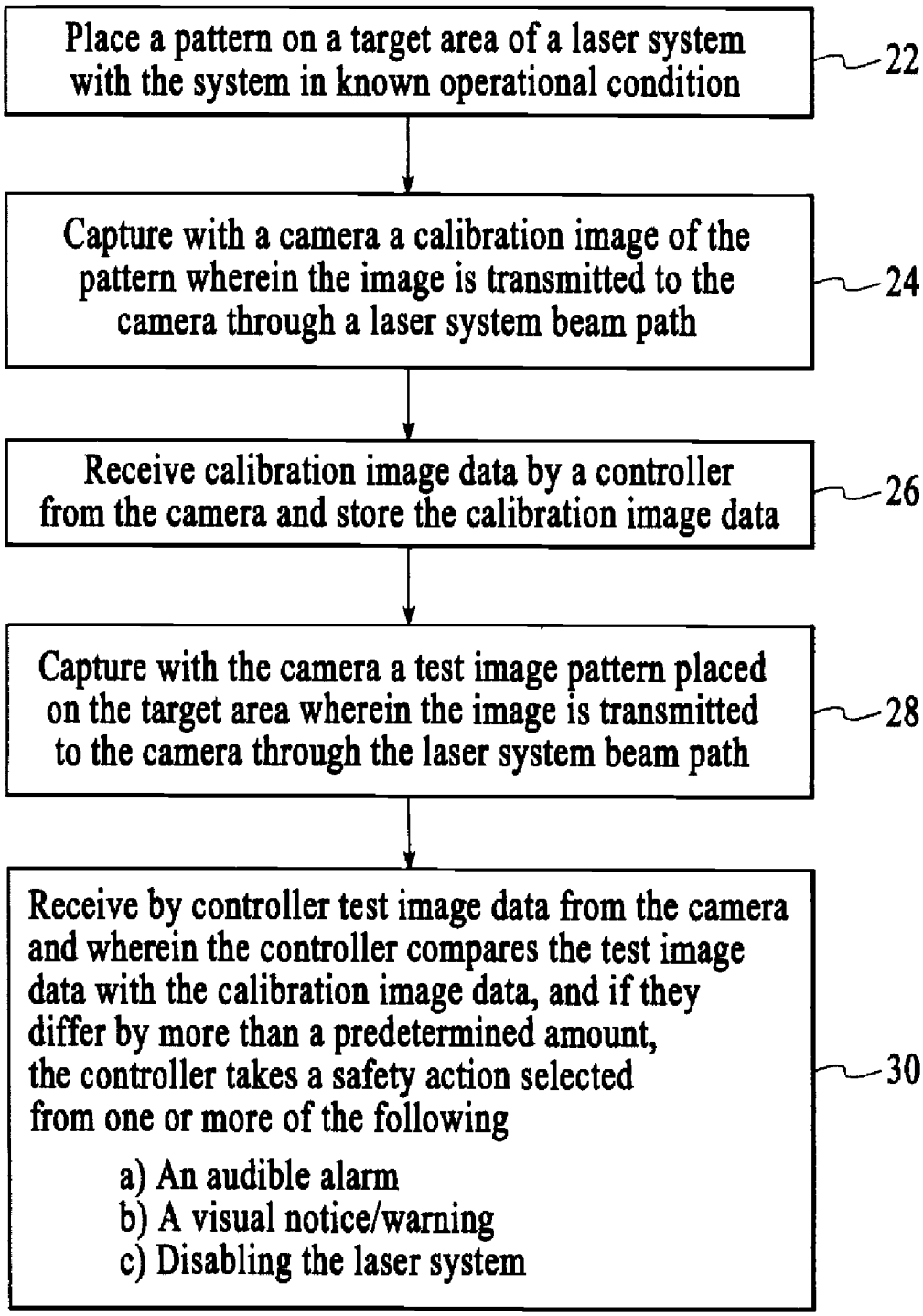
FIG. 2 is a method flow chart of a process as in FIG. 1 with detail describing an embodiment wherein the camera viewing is through a laser beam path.

FIG. 2 is a method chart for describing of a particular embodiment of the method generally described in reference to FIG. 1. A calibration image pattern is placed on the target area with the system in acceptable operating condition (block 22). This pattern can be a material pattern or a pattern projected onto the target area by a projector. A camera is placed for the purpose of capturing an image of the pattern by way of light passing through a laser beam path of the laser system (block 24). In order to accomplish this, the camera apparatus in one embodiment is configured to be moveable into the light path for capturing the image, and out of the light path for operation of the system. In another embodiment a steering mirror is used to deflect the image from the system laser path to the camera for calibration and test of the system. In still another embodiment, a mirror (or cube or other optical component) highly transparent to the laser wavelength but reflective to a sufficient degree for different wavelengths (typically visible) is used to deflect the image to the camera. An alternative is for the image viewing light (typically visible) to be transmitted by the mirror, etc., with the laser wavelength reflected. In embodiments where the laser light and image viewing light are separated as described above by a mirror, etc., that reflects either the laser light or image viewing light and passes the other, the camera is typically (but not necessarily) disabled when the laser is used, in order to avoid a saturation of the camera that could be caused by an intense laser beam partially reflected or passed by the mirror, etc., into the camera. The calibration image data is then received by a controller and stored (block 26). Prior to operation of the laser system, the same pattern is again placed on the target area, which will be termed a test pattern image and the camera again captures the image and provides test pattern image data (block 28), which is then received by the controller, which compares the test data with the calibration data and takes a safety action if they differ by more than a pre-determined amount (block 30).

Figure 3:
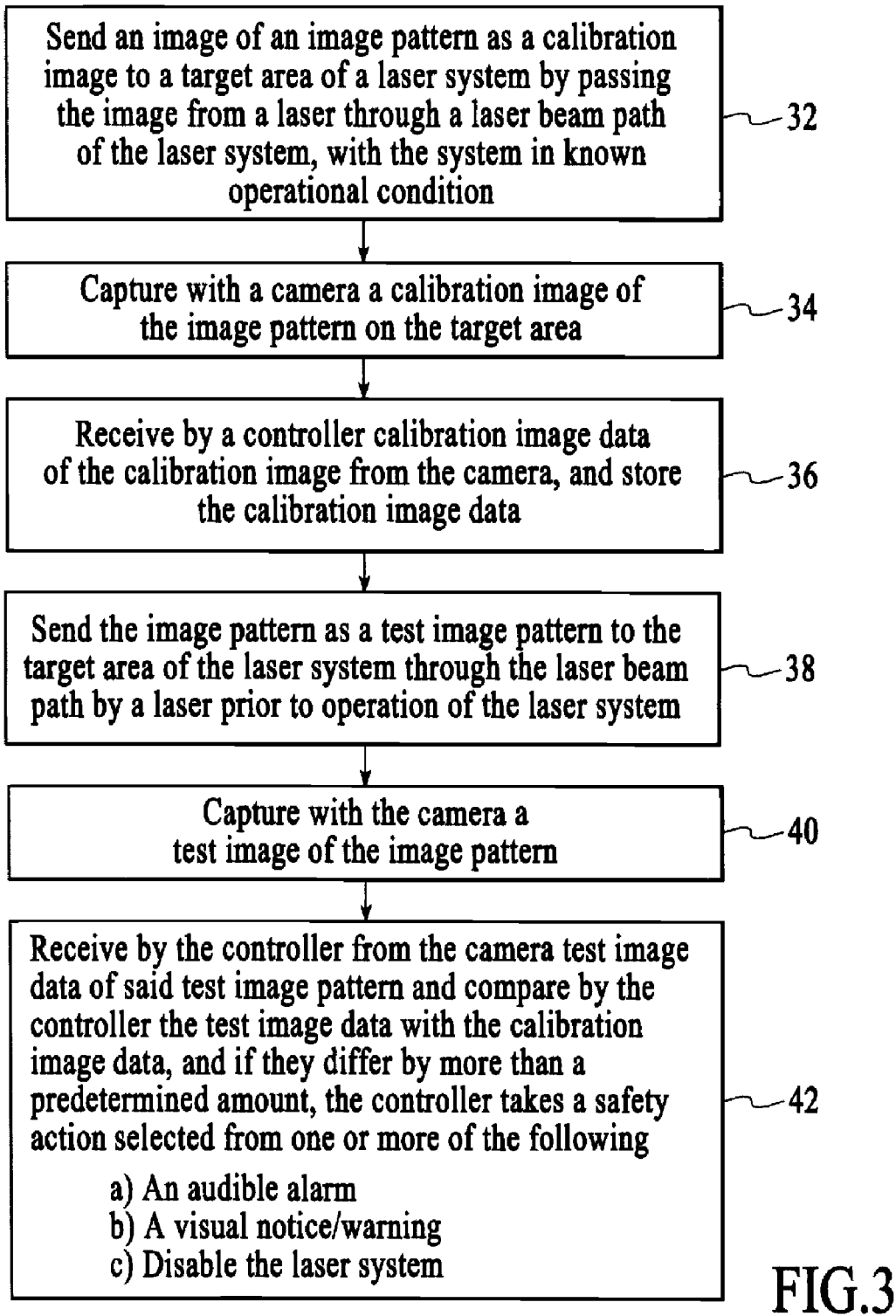
FIG. 3 is a method flow chart of a process as in FIG. 1 with detail describing an embodiment wherein an image pattern is sent to a target with a laser beam through the laser beam path.

FIG. 3 is a method flow chart to describe another embodiment of the present invention as generally set forth in reference to FIG. 1. In the embodiment of FIG. 3, the calibration and test image patterns are projected onto the target area by means of a low power laser beam, such as a Class 3a laser beam passing through the system laser beam path. Block 32 describes the calibration with this method, performed with the system in known acceptable working condition. According to the method, a low power laser apparatus is configured to place a beam in the laser path for calibration and test purposes, and then to restore the laser path for system laser operation. This can be done, for example, by moving the low power laser into and out of the system beam path, by having a moveable beam steering mirror along the laser path to reflect/direct the low power beam into the system path and then move the mirror out of the path for system operation, or by having a fixed mirror or other optical component that is highly reflective at one wavelength (e.g. the low laser power) but transparent at another wavelength (e.g. the system laser), to reflect/direct the low power beam into the system path without having to move the mirror out of the path for system operation. The use of mirrors or other optical components described above for the camera, low power laser, and system laser allows the paths for each to remain stationary, which is mechanically more simple. A camera is positioned in a fixed location relative to the target area for capturing a calibration pattern image placed on the target area by the low power laser beam (block 34). The calibration data is then received and stored in the controller (block 36). Prior to operation of the laser system, the low power laser beam is again injected into the system laser beam path to place a test pattern image on the target area (block 38), and the camera captures an image of the test pattern image (block 40), and the controller receives the test data from the camera and compares it with the calibration data and takes an action if they differ more than a prescribed amount (block 42). In the various method charts, the action termed "disabling the laser system" means disabling the laser system source.

Figure 4:
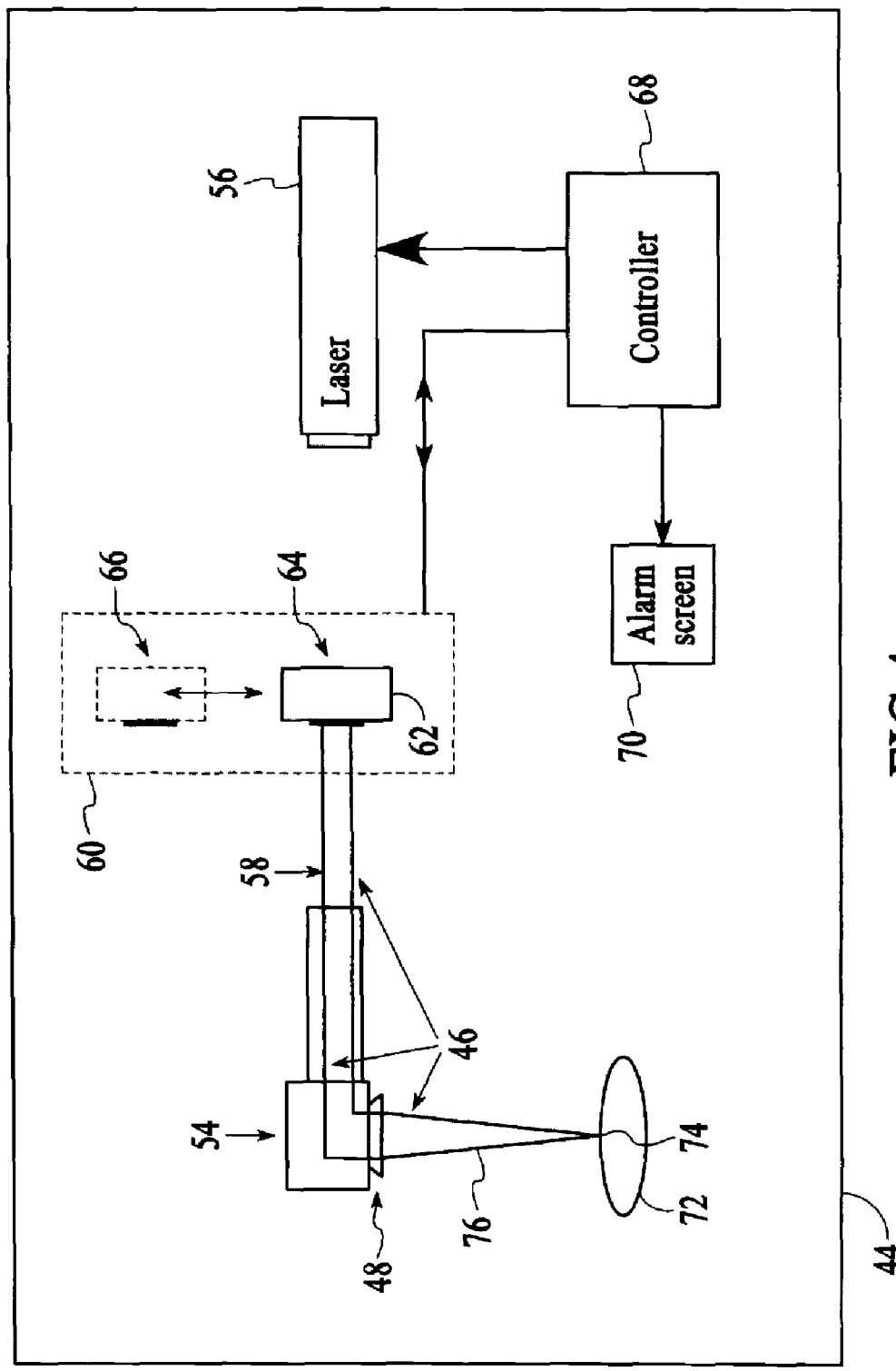
FIG. 4 is a diagram of a laser safety system depicting the insertion of a camera into a laser beam path to capture an image according to an embodiment of the present invention.

Details of apparatus corresponding to the methods of FIGS. 1-3 will now be described in reference to the following figures of the drawing. With reference to FIG. 4 a laser safety system ("safety system") 44 includes laser beam path apparatus 46, including a focusing lens 48, and a beam steering device 54. The system 44 also includes a system laser source 56 for supplying a laser beam to laser beam path 58. The embodiment of FIG. 4 corresponds to the method of FIG. 2 to the extent that a camera apparatus 60 provides a camera 62 moveable into the laser beam path 58 as shown at 64, and out of the path 58 as shown at 66. A system controller 68 serves the functions described in reference to FIG. 2, and also can alternatively direct the operation of the camera apparatus 60. FIG. 4 also shows an alarm and/or visual indicator 70. The image pattern is indicated as on plane 72, with a focal point 74. In comparing the calibration and test images, the system 44 determines the presence, integrity and/or focus of focusing lens 48 and other problems which may occur in the laser beam path.

Focusing lens 48 is typically any standard focusing lens or lenses, such as an F-Theta lens, utilized in the art for focusing a laser beam 76 or beams on the focal point 74, as depicted in FIGS. 4 and 5.

Camera 62 is any form of camera in the art including video, still, digital, film or Polaroid, among others, capable of capturing the image on target 72 through focusing lens 48 and capable of outputting a signal to the controller. In addition, if desirable, camera 62 can have infrared capabilities. Camera 62 is associated with the controller 68, such as a computer or visualization system which controls the camera, and processes, manipulates, stores and compares the images. The controller 68 can also include a human operator who controls all or a portion of the controller's functions.

Figure 5A:
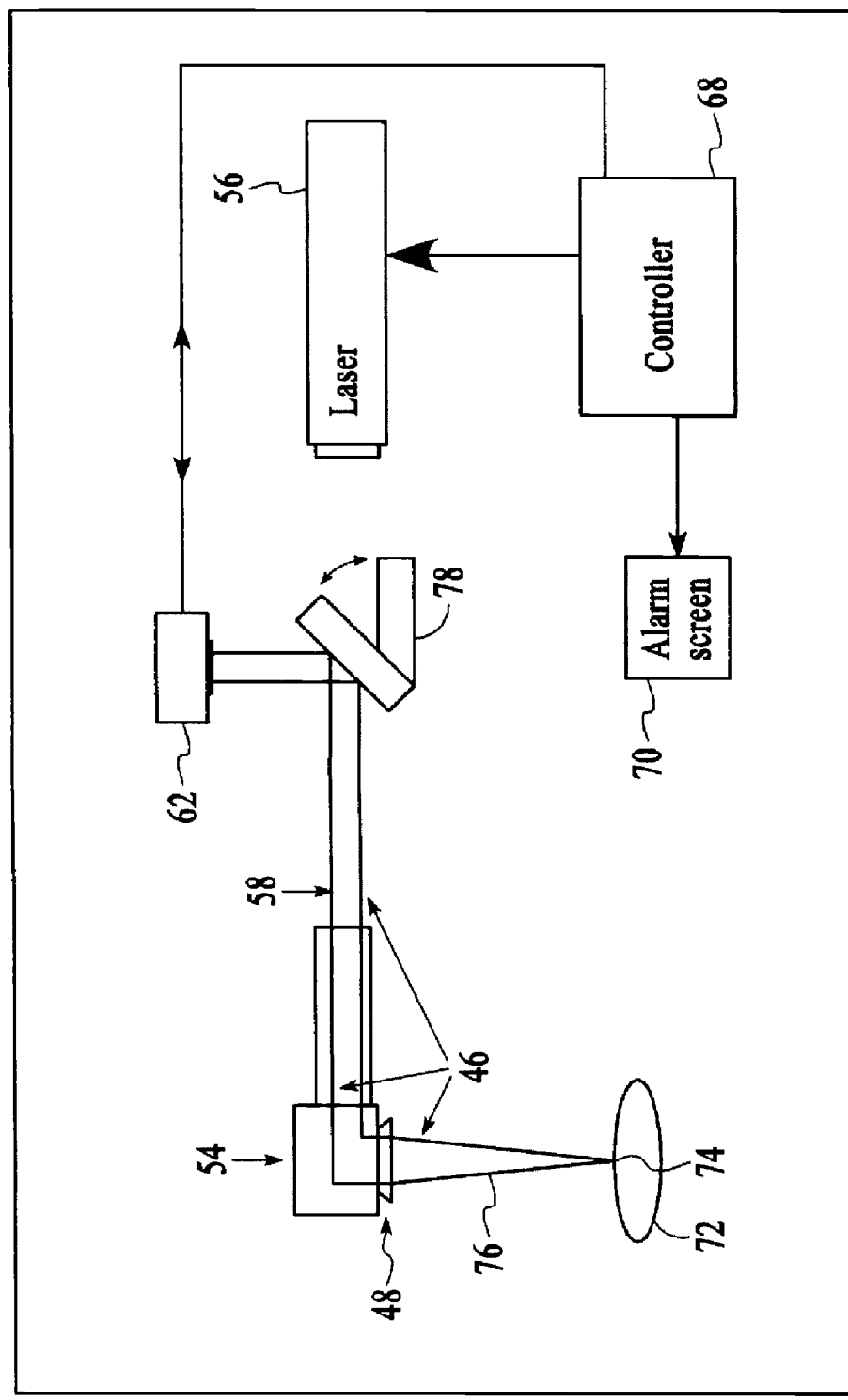
FIG. 5a is a diagram of a laser safety system showing the pivoting of a viewing device into the beam path to allow the camera to capture an image.

Camera 62 may be moveably located such that it captures the image from a position in-line with beam 76, as depicted in FIG. 4. To do so, camera 62 is moved to a position between the laser beam source 56 and target 72 at any point along the beam path 58 (FIG. 4) or as shown in FIG. 5a, a viewing device 78 is pivoted into the beam path to direct the camera's view along the beam path. Such a position may be located anywhere along beam path 58. Insertion of camera 62 along beam path 58 allows laser safety system 44 (FIG. 4) or 80 (FIG. 5) to determine the presence, alignment and/or integrity of the steering device as well as that of focusing lens 48.

Camera 62 generally is inserted into the beam path 58 in a position before the focusing lens 48, as shown in FIGS. 4 and 5a. Such placement allows focusing lens 48 to become a component of the vision system of camera 62, and therefore any flaws in the focusing lens, including its absence are detected in the resulting image captured by the camera.

Figure 5B:
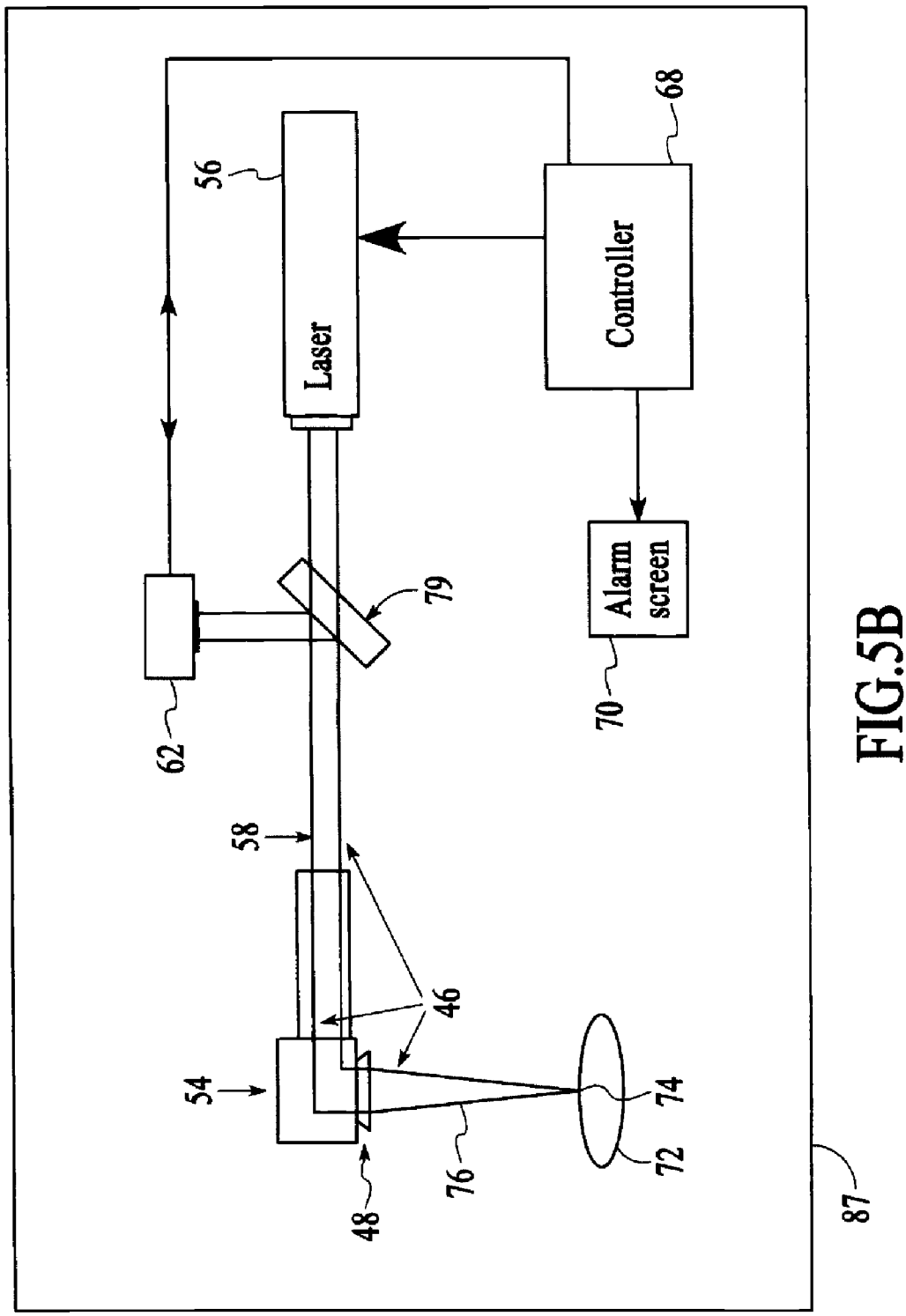
FIG. 5b is a diagram of a laser safety system showing the insertion of an optical component into the system beam path to reflect light of desired wavelengths to allow a camera to capture an image.
Figure 5C:
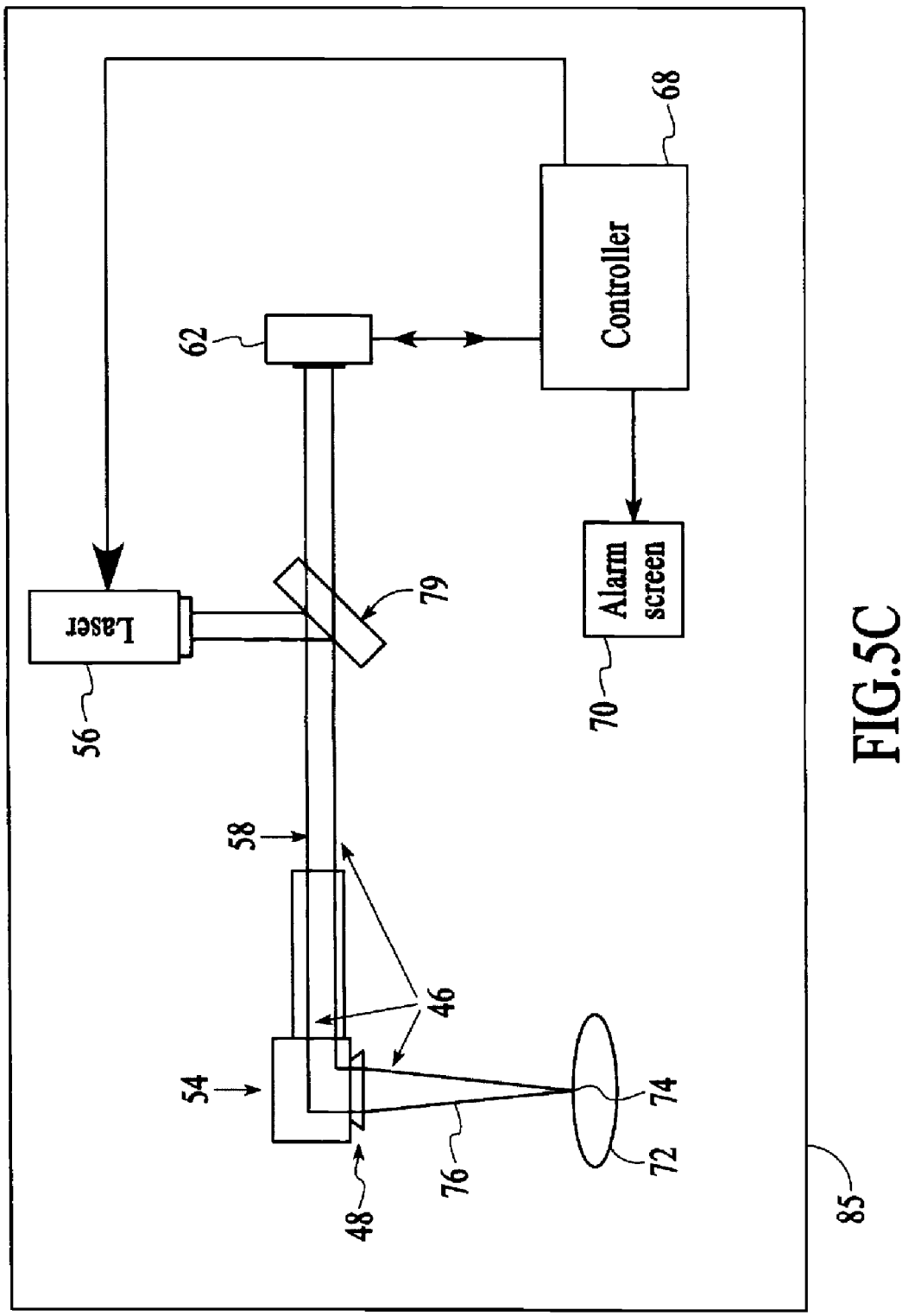
FIG. 5c is a diagram of a laser safety system showing the insertion of an optical component to deflect the system beam path while transmitting light of desired wavelengths to a camera to capture an image.

Camera 62 can also be located as depicted in FIG. 5b. To do so, a mirror 79 or other optical component is added in a position between the system laser source 56 and target 72. The mirror is highly reflective at certain wavelengths (e.g. visible) but transparent at the system laser wavelength (e.g. infrared). The mirror reflects the image into the camera but allows the system laser light to pass to the steering device. There is no need to move the camera or the mirror for system operation. When the mirror or other optical component is opposite, i.e. reflective of the system laser wavelength but transparent to the light sensed by the camera, the location of camera 62 is exchanged with the location of system laser source 56, as shown in FIG. 5c.

The image is any image captured by camera 62 suitable for determining the presence, integrity and focus of focusing lens 48, and any steering mirrors included in the camera's view. The image may be a color image, black and white, grey scale, green scale, or of any other suitable coloration. The image can utilize any resolution suitable for analyzing the properties of focusing lens 48. A high resolution image may provide greater precision and a greater ability for determining the presence, integrity and focus of focusing lens 48. Further, more than one image can be captured by camera 62. For example, an initial image can be captured when focusing lens 48 is known to be present, in good condition and in focus, as a calibration/reference. A second, test image, is then captured prior to a laser processing operation and is compared to the initial image to determine if focusing lens 48 and other path components remain present and in good condition and focus.

As depicted in FIGS. 4 and 5, target 72 is any object or surface upon which laser processing is to take place. Generally, focal point 74 is located on or just above target 72 such that the energy of beam 76 is focused on the target, or work surface, and therefore, focusing lens 48 is typically focused on or just above the target. Thus, the image captured by camera 62 through focusing lens 48 is typically focused on target 72. The appearance and characteristics of an image pattern on target 72 are used to determine the presence, integrity and/or focus of focusing lens 48.

The arrangement of the components of a safety system according to the present invention can be made in various ways, such as the examples shown in FIGS. 4 and 5. Beam 76 is steered along beam path 58 to the beam steering device 54 which directs the beam through the focusing lens 48. Focusing lens 48 focuses beam 76 on focal point 74 on or near target 72 for laser processing. Camera 62 can be located at any point along beam path 58, but preferably prior to the focusing lens 48 and device 54. The camera 62 is inserted into the beam path 58 to capture the image or images when laser beam source 56 is disabled. As depicted in FIG. 5, where viewing device 78 is utilized to direct the view of camera 62, the camera can again be placed at any point along beam path 58. Typically, viewing device 78 is pivotally located near beam path 58 such that it can be pivoted into the beam path when laser beam source 56 is disabled, to allow camera 62 to capture the image, and is pivoted out of the beam path when the beam source is enabled, to avoid interaction with beam 76.

In operation, the embodiment of the present invention as described in reference to FIG. 4, captures the image of target 72 from along beam path 58. While laser beam source 56 is disabled, camera 62 is positioned within beam path 58 at a point where its view includes the view through device 54 and focusing lens 48. The focusing lens 48 and the steering device thereby become part of the imaging system of camera 62, and if they were to be missing or damaged, this would be reflected in the resulting images. For calibration, camera 62 captures an initial calibration image while focusing lens 48 is known to be present, in good condition and in focus on target 72. Camera 62 then captures a second (test) image prior to activation of laser beam source 56 for laser processing. The controller 68 compares the initial (calibration) image and the second (test) image to determine if the images match.

The images are required to be within a margin of predetermined allowable error, which can be zero (match exactly). A margin of error is determinable by design and/or for each application as is desirable by the operators. If the images match, the presence, good condition and good focus of focusing lens 48 is indicated. If focusing lens 48 is damaged, out of focus or is missing, the resulting image captured by the camera 62 will be blurry, blank or otherwise distorted as compared to the initial calibration image. If the images are determined to match exactly or within a predetermined margin for error, camera 62 may be removed from beam path 58 and laser beam source 56 enabled for processing. If the images are determined not to match within a predetermined error, then the controller can take a safety action, including for example, disabling the laser beam source 56, providing a perceivable alarm, and/or providing a visible notice. The laser system can then be inspected for sources of the problem.

The alarm may be visual, audible, or both and may be provided to alert operators of a possible problem with focusing lens 48, or with any steering mirrors that are included within the view of camera 62. Upon correction of the problem, another image is captured to ensure that the problem is alleviated and that the laser system is again safely operable. Further, upon assurance by the safety system that the laser system is safely operable, the camera 62 is removed from beam path 58 and laser beam source 56 enabled.

Referring now to FIG. 5a, a safety system 80 is shown wherein camera 62 is located outside of beam path 58. Camera 62 is fixedly mounted at any suitable position outside of and along beam path 58. Camera 62 is able to capture images by first pivoting viewing device 78 into beam path 58. The image or images are compared or manipulated by the controller 68 in any manner previously described, and such comparisons are utilized to determine the safe operability of laser system 80.

Viewing device 78 allows camera 62 to view target 72 from along beam path 58 and through steering device 54 and focusing lens 48. Viewing device 78 may be a steering mirror, or other device which may direct the visible light from target 72 and along beam path 58 into camera 62. Viewing device 78 is typically utilized while laser beam source 56 is disabled, or if it is of a design that is transparent to beam 76, then the viewing device can be used when the laser beam source is either enabled or disabled. If viewing device 78 is used while laser beam source 56 is enabled, proper safety measures should be taken to ensure that beam 76 is not reflected or scattered by the viewing device and does not create a safety risk to surrounding personnel or objects.

FIG. 5b shows a configuration similar to FIG. 5a, except that optical component 79 replaces pivoting viewing device 78. As discussed above with reference to FIG. 2, optical component 79 is transparent to the laser wavelength but reflective of the wavelength(s) sensed by the camera. Thus, the image of the work area can be viewed and the laser light transmitted to the work area without moving optical component 79. FIG. 5c illustrates a similar situation where optical component 79 is reflective of the laser light but transmits the wavelength(s) sensed by the camera.

In another embodiment, a galvo scanner or other type of scanning or steering system using one or more steering mirrors to steer one or more beams through a focusing lens, such as an F-Theta lens, may be utilized (not shown). In such an embodiment, camera 62 is used to scan the entire processing area to verify that the focusing lens 48 is present, intact and focused.

Figure 6:
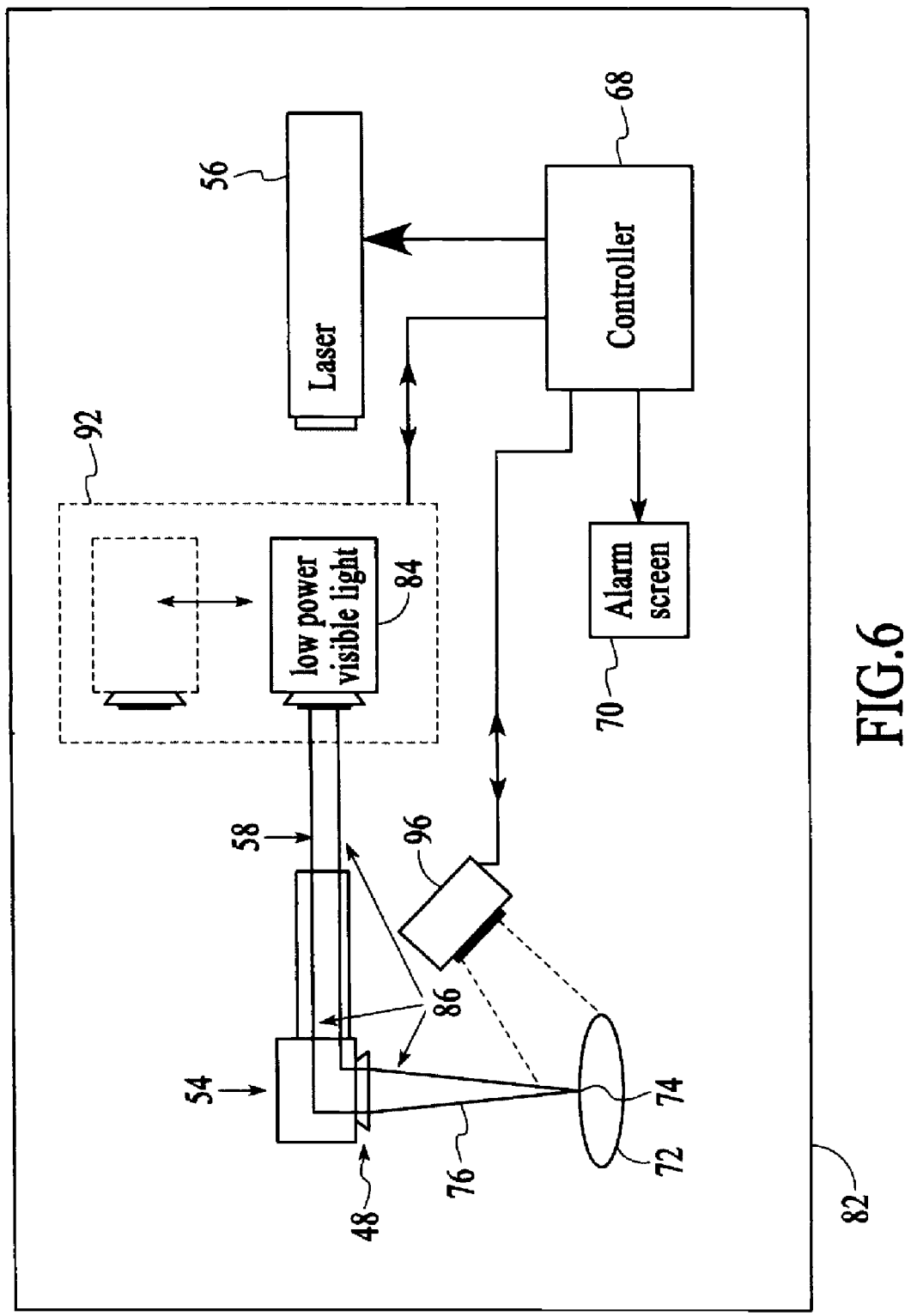
FIG. 6 is a diagram of a laser safety system depicting the insertion of a low-power visible light laser into the beam path and a camera for capturing an image according to another embodiment of the present invention.
Figure 7:
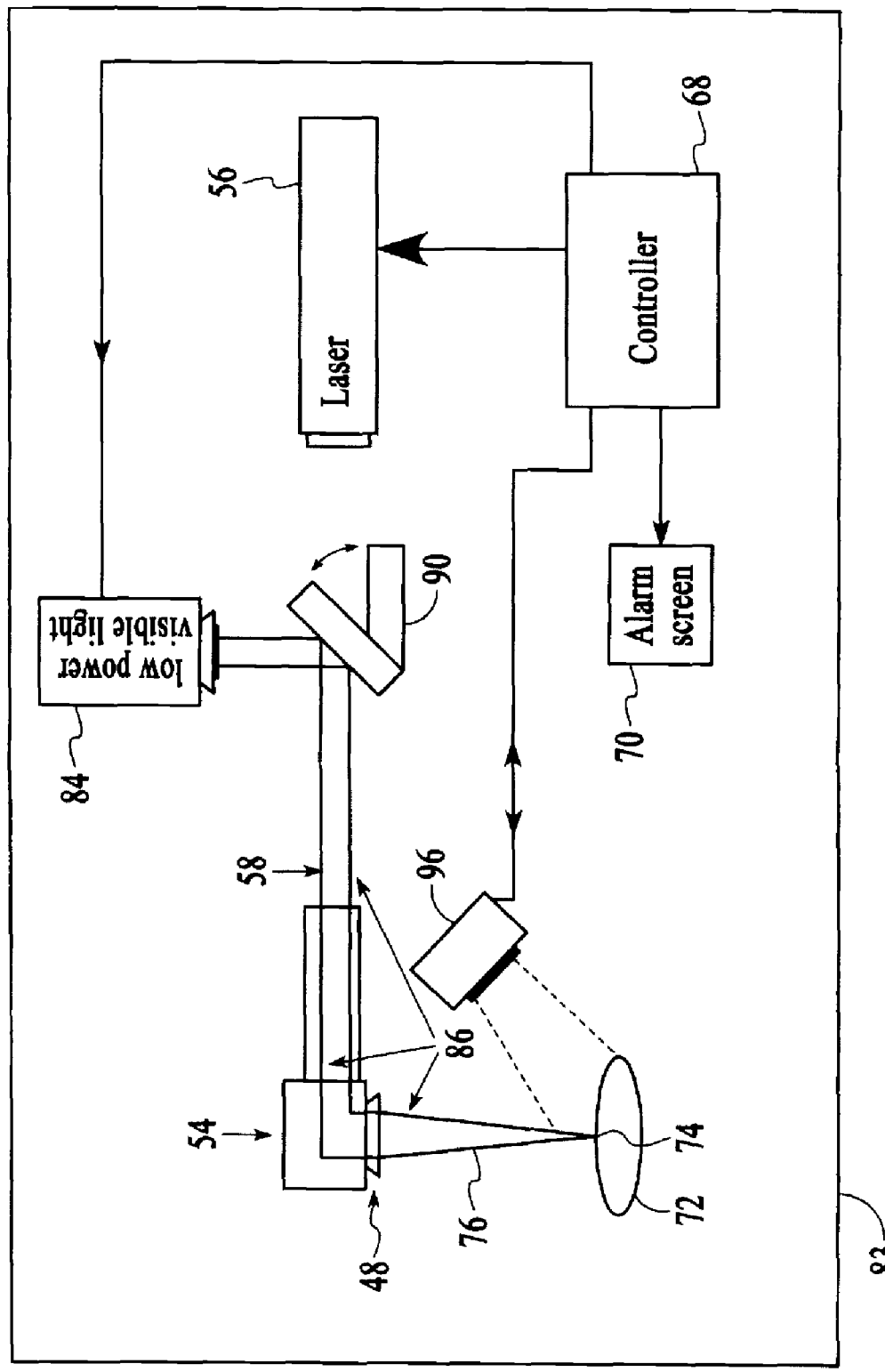
FIG. 7 is a diagram of a laser safety system depicting a low-power visible light laser directed into the beam path via a pivoting steering mirror.
Figure 8:
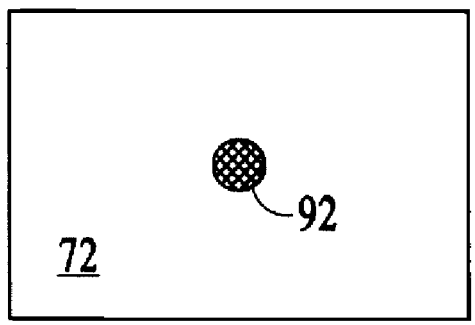
FIG. 8 is two exemplary images captured by the camera of FIG. 6 depicting figures projected by the low-power visible light laser onto the target when the focusing lens is present, in good condition and in focus.
Figure 8:
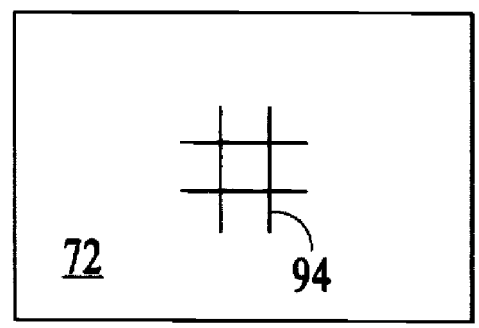

Referring now to FIGS. 6, 7 and 8, safety systems 82 and 83 are shown according to another embodiment of the present invention. A low-power visible light laser 84, such as a Class 3a laser, is employed in addition to laser beam source 56. Low-power visible light laser 84 is any type of laser, generally a Class 3a rated laser, which would pose little to no risk of harm to personnel and nearby objects, and produces a laser beam with wavelengths within the visible range. If an infrared camera is employed for camera 96, then a low-power laser providing a beam in the infrared spectrum can also be used. A beam 86 from low-power visible light laser 84, upon striking target 72, produces a figure, for example as shown in FIG. 8, the characteristics of which are sensed by camera 96 and analyzed by the controller 68 to determine the presence, integrity and focus of focusing lens 48 and/or steering device 54 between the low-power visible light laser and the target. For ease of illustration, camera 96 is shown outside the beam path, but can also be configured in the beam path as shown in FIGS. 5a-5c.

Low-power visible light laser 84 as part of a laser apparatus 92 (FIG. 6), may be removeably placed in-line with beam path 86 such that it projects a beam directly along the beam path 86. Additionally, low-power visible light laser 84 may be mounted outside of beam path 58 (FIG. 7), and a steering mirror 90 may be pivoted into the beam path in order to steer beam 86 along the beam path, among other methods of steering the low-power visible light laser into the beam path, or placed out of the beam path and directed to a target in the same manner shown in FIGS. 5b and 5c for camera alignment.

Figure 9:
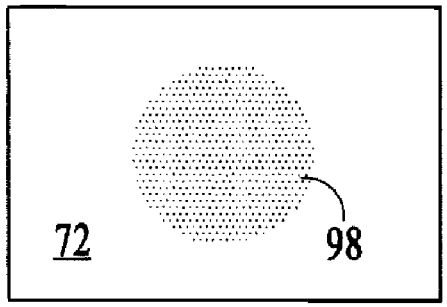
FIG. 9 is a depiction of six exemplary images captured by the camera of FIG. 6 depicting figures projected by the low-power visible light laser onto the target when the focusing lens is not functional due o any condition including not being present, not in good condition and not in focus.
Figure 9:
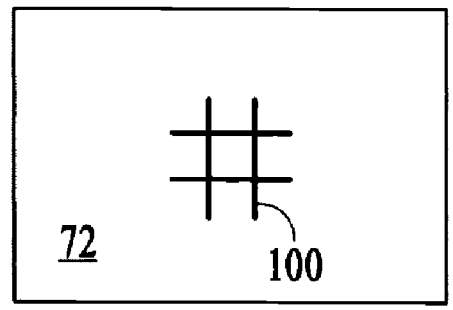
Figure 9:
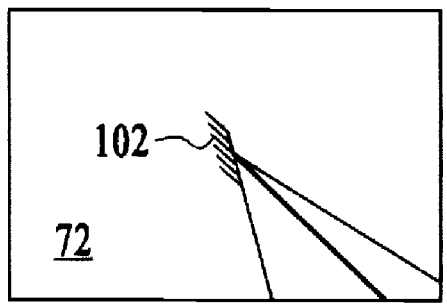
Figure 9:
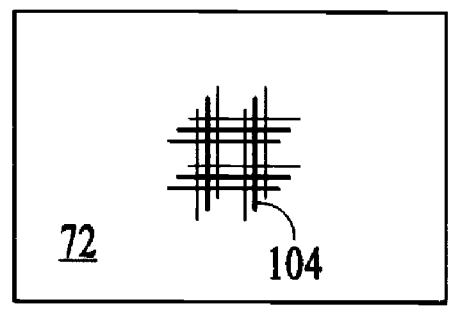
Figure 9:
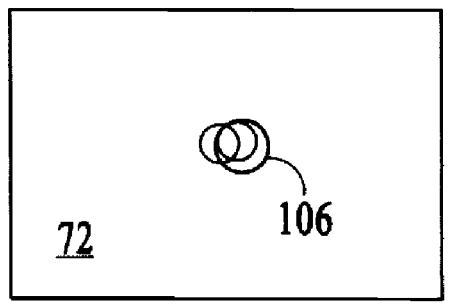
Figure 9:
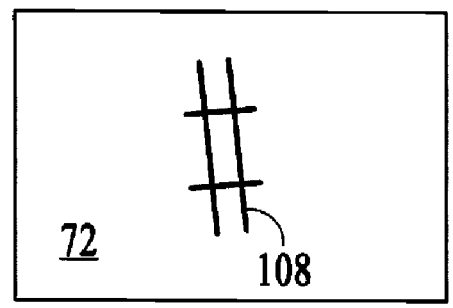

FIG. 8 illustrates example images 92 and 94 projected on a work/target plane of target 72 by the low-power visible light laser 84 of FIGS. 6 and 7. Such images may include for example grids, or mask patterns and may be produced by stable propagation of the low-power visible light laser 84, or through rasterization of beam 86, among other methods. FIG. 8 shows examples of images as they it may appear when focusing lens 48 is present, in good condition and in focus. An image such as those shown in FIG. 8 may be analyzed to determine the presence, integrity and focus of focusing lens 48 and other elements in the laser beam path, such as the mirrors. If an image appears on target 72 after passing through focusing lens 48 in an expected form, whether that is a spot, grid or mask pattern, with crisp boundaries, and with an expected size, then the presence, integrity and focus of the focusing lens is indicated. If the image appears blurry, faint, distorted, in double, triple or multiple images, such as the examples 98-108 shown in FIG. 9, or if the image is not visible, then the controller is alerted to a potential problem existing in focusing lens 48 or device 54 through which the low-power visible light laser 86 passes.

FIGS. 6 and 7 show a camera 96 capturing an image on the target 72 as it appears on target 72 from a location outside beam path 58, but the camera 96 may also capture the image from points along the beam path 58 as described above in reference to FIG. 4 and FIGS. 5a-5c.

A low-power visible light laser 84, such as a Class 3a laser, is employed as shown in FIG. 6, by directing beam 86 along beam path 58 which includes focusing lens 48, and may include other beam steering devices such as 54. By doing so, low-power visible light laser 84 creates a visible spot, line, mask or other image pattern on target 72. The controller 68 determines the presence, integrity and focus of focusing lens 48 and other elements by viewing the size, crispness and intensity, among other properties, of the image on the target 72. This determination is typically made by capturing an initial calibration image of the image pattern on target 72 with camera 96 when focusing lens 48 is known to be present, in good condition and in focus, and any other beam path elements also in good working condition, and then capturing a second test image prior to enabling the laser beam source 56. The initial calibration image and second test image are then compared to determine if the characteristics of the patterns match within a predetermined margin of error. Additionally, as an alternative embodiment in the method of the present invention, the pattern can be employed to determine the presence, integrity or focus of focusing lens 48 by either comparing the initial image to the observable appearance of the pattern prior to enabling laser beam source 56, or by only viewing the properties of the pattern as seen on target 72 and determining whether the observed properties meet predetermined requirements such as shape, size, crispness, or intensity of the pattern, among others. In this latter case, the initial calibration procedure is avoided.

If the properties of the pattern are found to be within determinable parameters, laser beam source 56 can be enabled. If the pattern appears blurry, or displays other negative characteristics, laser beam source 56 remains disabled, and a safety action/alert is provided. Further, the appearance of the pattern may be used to assist in tuning and focusing the laser system 82 or 83 and focusing lens 48.

Where a system employs a galvo scanner or other type of scanning or steering system using one or more mirrors to steer one or more laser beams through focusing lens 48, such as an F-Theta lens (not shown), camera 96 may be used to scan the entire processing area including target area 72 to verify that the focusing lens 48 is present, intact and focused.

Figure 10:
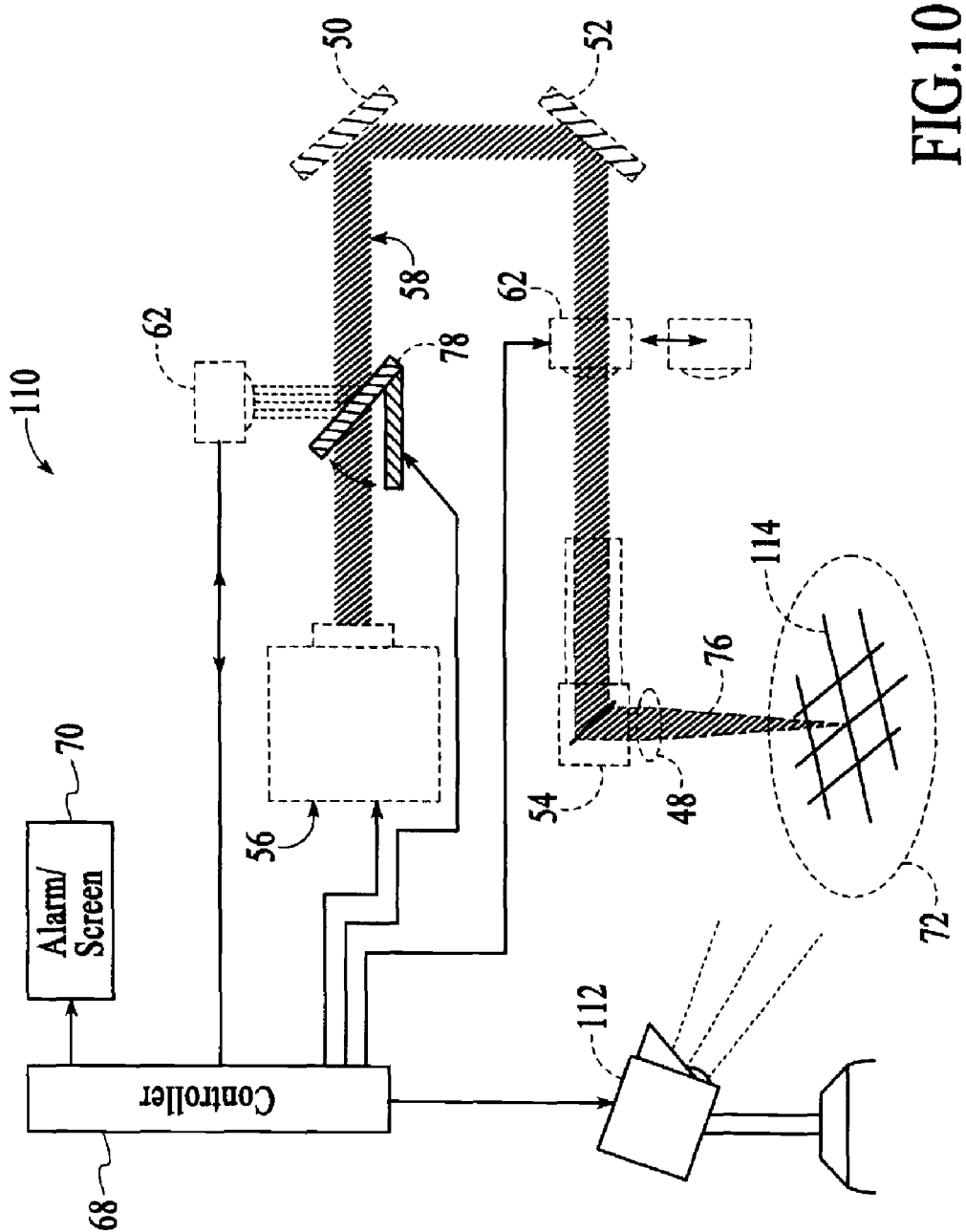
FIG. 10 is a diagram of a laser safety system depicting the projection of a mask onto the target according to another embodiment of the present invention.
Figure 11:
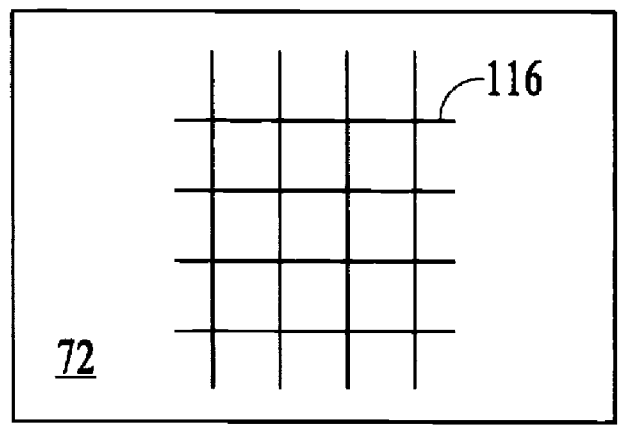
FIG. 11 is a depiction of three exemplary images of a mask pattern captured by the camera of FIG. 10 when the focusing lens is present, in good condition and in focus.
Figure 11:
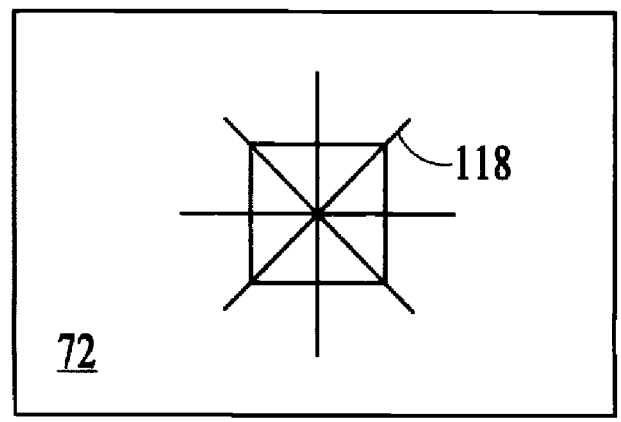
Figure 11:
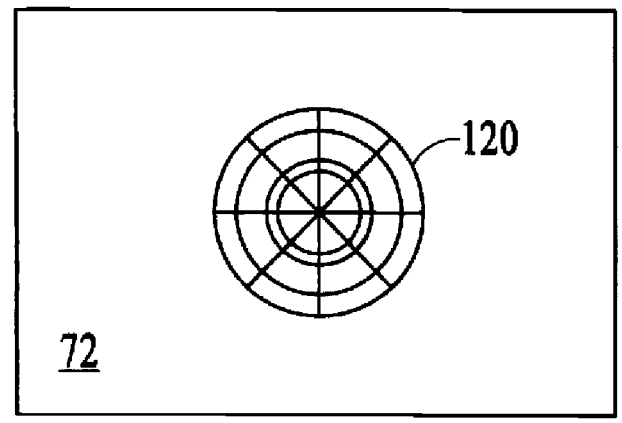

Referring now to FIG. 10, a safety system 110 is disclosed according to an embodiment of the present invention. A light source 112 is used to project a mask pattern 114 on target 72. Light source 112 generally comprises any suitable light source including lasers, LEDs, incandescents, or fluorescents, among others useable to project mask pattern 114. Filters or other coverings (not shown) can be used along with light source 112 to allow the light source to project a desired mask pattern 114. Mask pattern 114 typically includes a grid or other pattern of lines, curves or shapes 116-120 as shown in FIG. 11. The controller 68 utilizes mask pattern 114 to determine the presence, integrity and focus of focusing lens 48 and condition of other laser path elements by capturing an image of target 72 with the mask pattern projected thereon from along beam path 58 utilizing camera 62. The determination of the presence, integrity and focus of focusing lens 48 is completed as described previously by capturing an initial calibration image and a second test image for comparison, or by capturing only a single test image for analysis of the appearance of mask pattern 114 as seen through the focusing lens. The appearance of mask pattern 114 in the image or images is analyzed for crispness, blurriness, double or multiple vision among other properties. If the controller 68 determines there is an adequate match between the initial calibration and second test images, or that mask pattern 114 is viewed in proper focus, then laser beam source 56 can be enabled, otherwise it is disabled and a safety action such as an alert or disabling of the laser is provided.

Mask pattern 114 provides benefits to the determination of focusing lens 48 focus, integrity and presence by providing more reference points to be used in image comparisons. It also provides more constant reference points where the position of the work piece or target 72 may not always be constant, among other possible benefits.

The present invention may also be adapted to provide calibration/test pattern recognition as a further safety feature. The initial calibration image captured by camera 62 can be compared to a new (test) image not only to determine focusing lens 48 presence, integrity and focus but also to determine if the correct target 72 upon which the pattern is placed is present, oriented correctly and in proper condition among other characteristics. The mask pattern 114 can be utilized by a controller 68 to assist in comparing images and recognizing the shape, structure, design or other qualities of the pattern on the target 72. If the controller 68 recognizes target 72 pattern as being the correct target pattern and being in proper condition, it may enable laser beam source 56 for processing. If the target 72 pattern is not recognized or is determined not to be in proper condition, then laser beam source 56 is disabled and an alert is provided.

One or more of the previously described embodiments may be combined to provide the benefits of each method to a laser processing system. Further, more than one camera and controller may be utilized as well.

Figure 12:
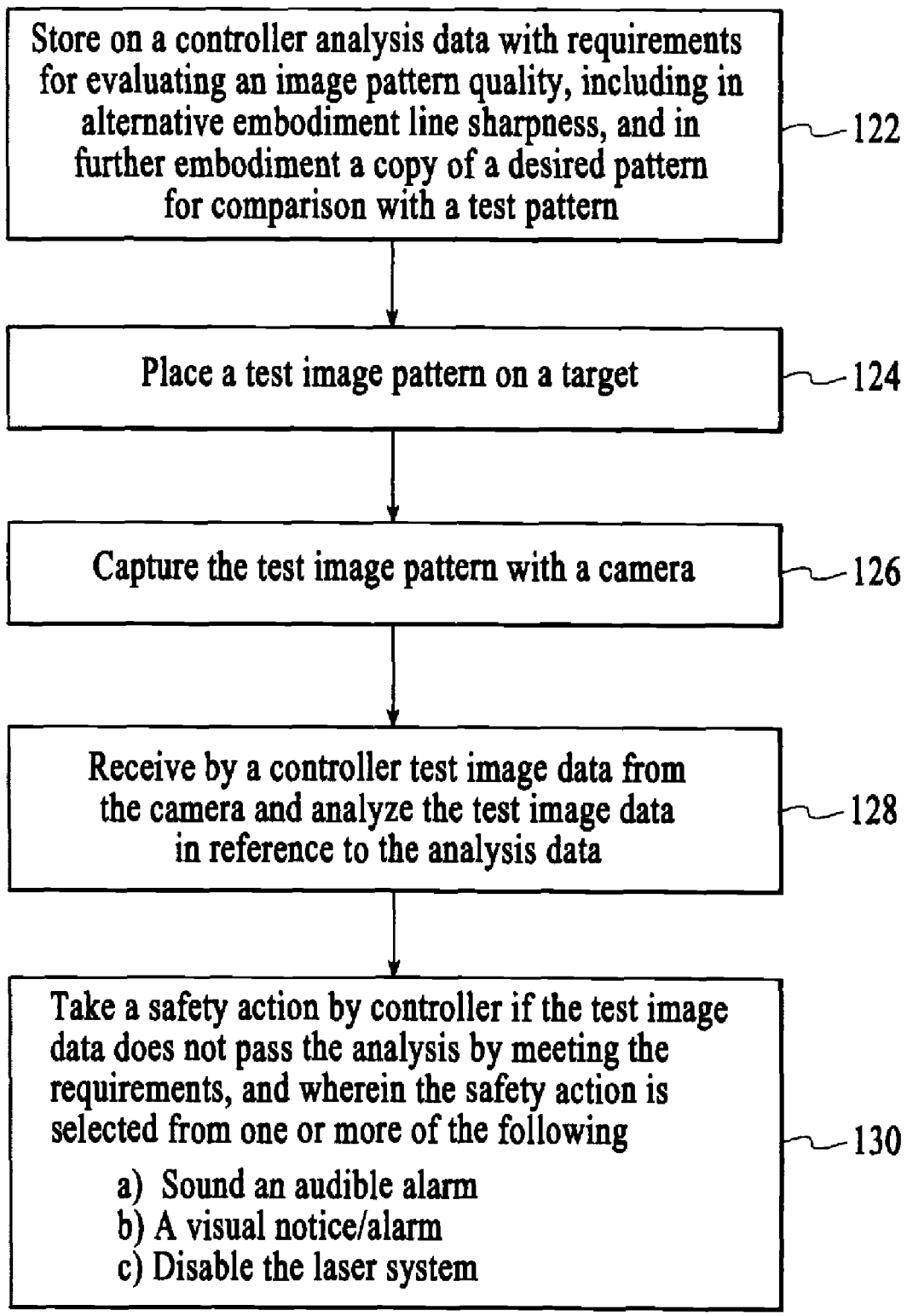
FIG. 12 is a flow chart similar to that of FIG. 1 except the calibration steps are replaced with a pre-programmed controller analysis.

As an alternative embodiment, to the method of FIG. 1, the calibration can be avoided as described above, and illustrated as a method in FIG. 12. The controller is programmed to analyze a pattern to determine the accuracy of specified parameters, such as line thickness and density (block 122). Alternatively, in addition, a specific reference pattern can be programmed into the controller in advance (block 122). The test pattern is placed on the target area (block 124), a test image is captured by a camera (block 126), and if the test pattern does not conform/pass the analysis, a safety action is provided (block 130).

Figure 13:
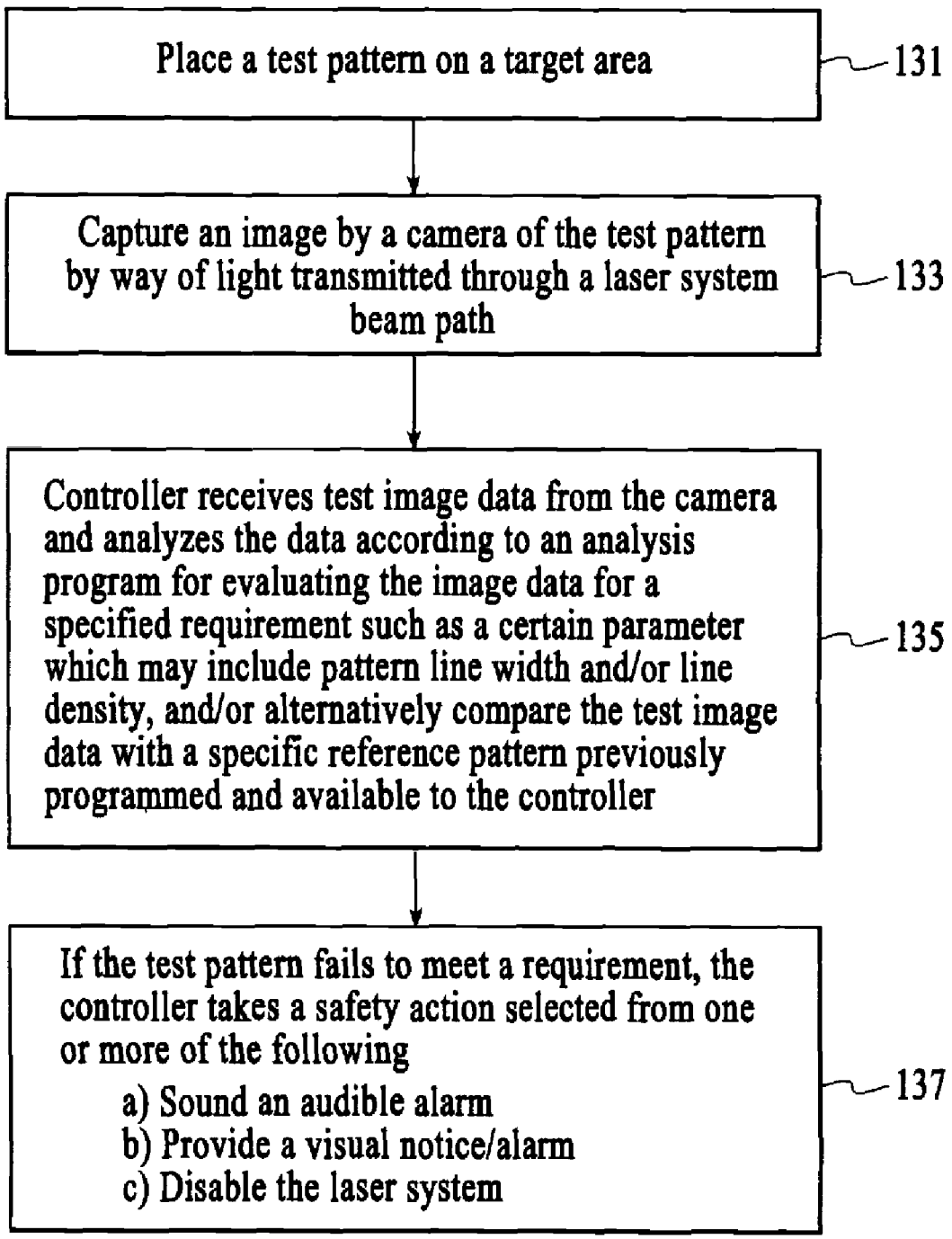
FIG. 13 is a flow chart similar to that if FIG. 2 except the calibration steps are replaced with a pre-programmed controller analysis.
Figure 14:
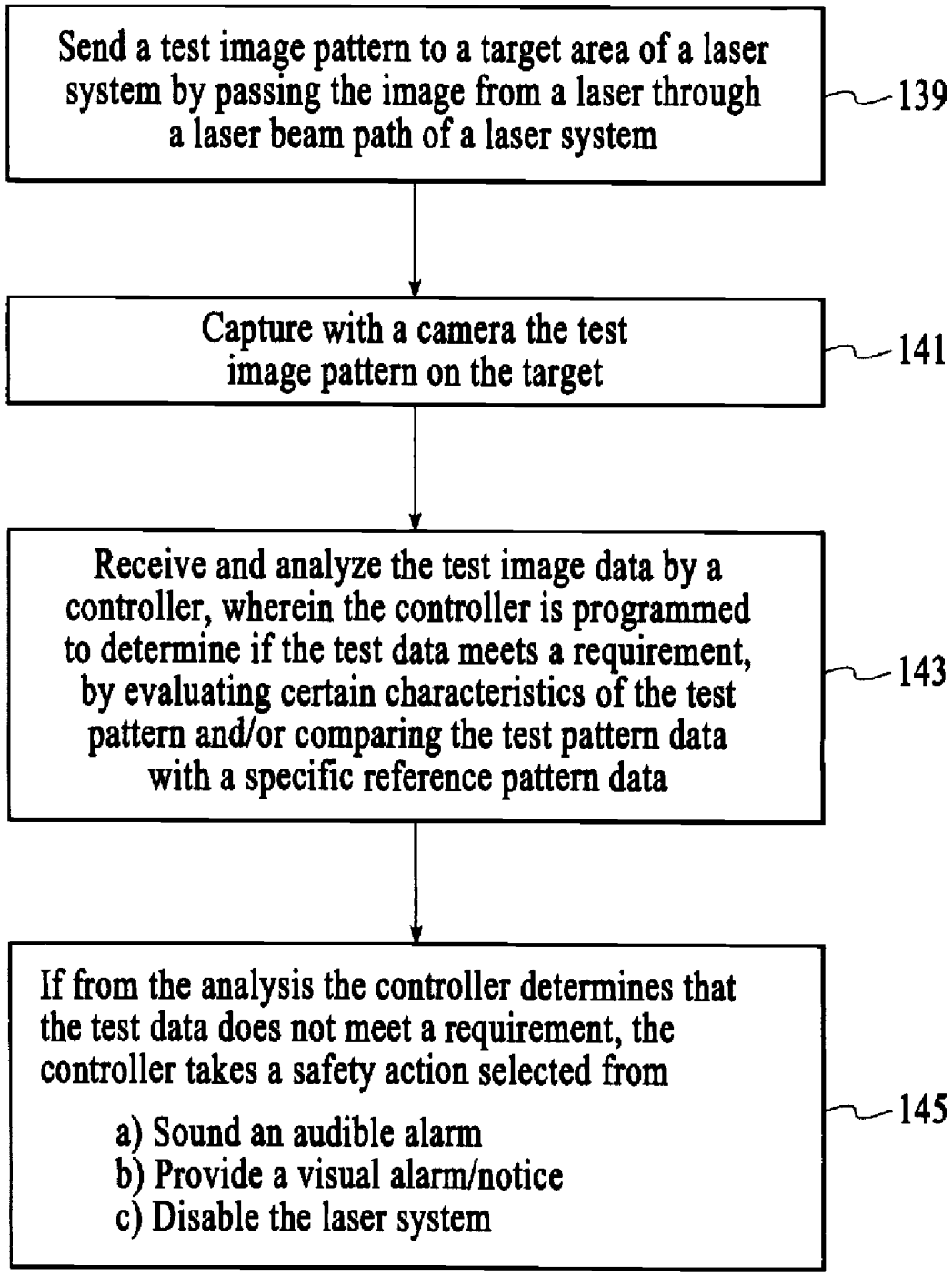
FIG. 14 is a flow chart similar to that of FIG. 3 except the calibration steps are replaced with a pre-programmed controller analysis.

FIGS. 13 and 14 are flow charts of a method similar to that described in reference to FIGS. 2 and 3 respectively, except replacing the two step calibration procedure with a pre programmed analysis and a specific reference pattern. According to FIG. 13, a test pattern is placed on a target area of the laser system (block 131). A camera then captures an image of the test pattern, wherein the image light travels from the pattern through a laser system beam path (block 133). A controller then receives test image data from the camera, and analyzes the data according to an analysis program for evaluating certain parameters, which according to various embodiments may include pattern line widths and uniformity of line density, and further alternatively may compare the test image data with a specific pattern programmed and available to the controller (block 135). If the test pattern fails to meet the requirement(s), the controller takes a safety action which may include an audible alarm, visual notice/alarm, and/or may disable the laser system (block 137).

FIG. 14 describes sending a test pattern to a target area of a laser system by passing the image from a laser through a laser beam path of a laser system (block 139). A camera then captures the test image pattern that is on the target (block 141). A controller receives test image data from the camera, the controller being preprogrammed to analyze the test image data to determine if it meets a requirement including certain characteristics of the test pattern, or alternatively to compare the test pattern data with specific reference pattern data (block 143). If the controller determines from the analysis that the test image data does not meet a requirement, the controller takes a safety action (block 145) which can include one or more of actions including sounding an audible alarm, providing visual notice/alarm and/or disabling the laser system.

The above disclosure describes checking the functionality of a laser system using a light beam to provide an image to a camera to capture an image and a controller to evaluate the image and determine if the laser system is in working condition. In the above embodiments, the image is a test image on a target, analyzed to determine if a laser beam path is in working order.

According to another embodiment of the present invention, a light beam is used to determine if a laser steering device is properly aligned. In each embodiment as described, a light beam of low power, such as a Class 3a beam, is used in various specific embodiments as a key element in a safety system to determine the working condition of a laser system.

Figure 15:
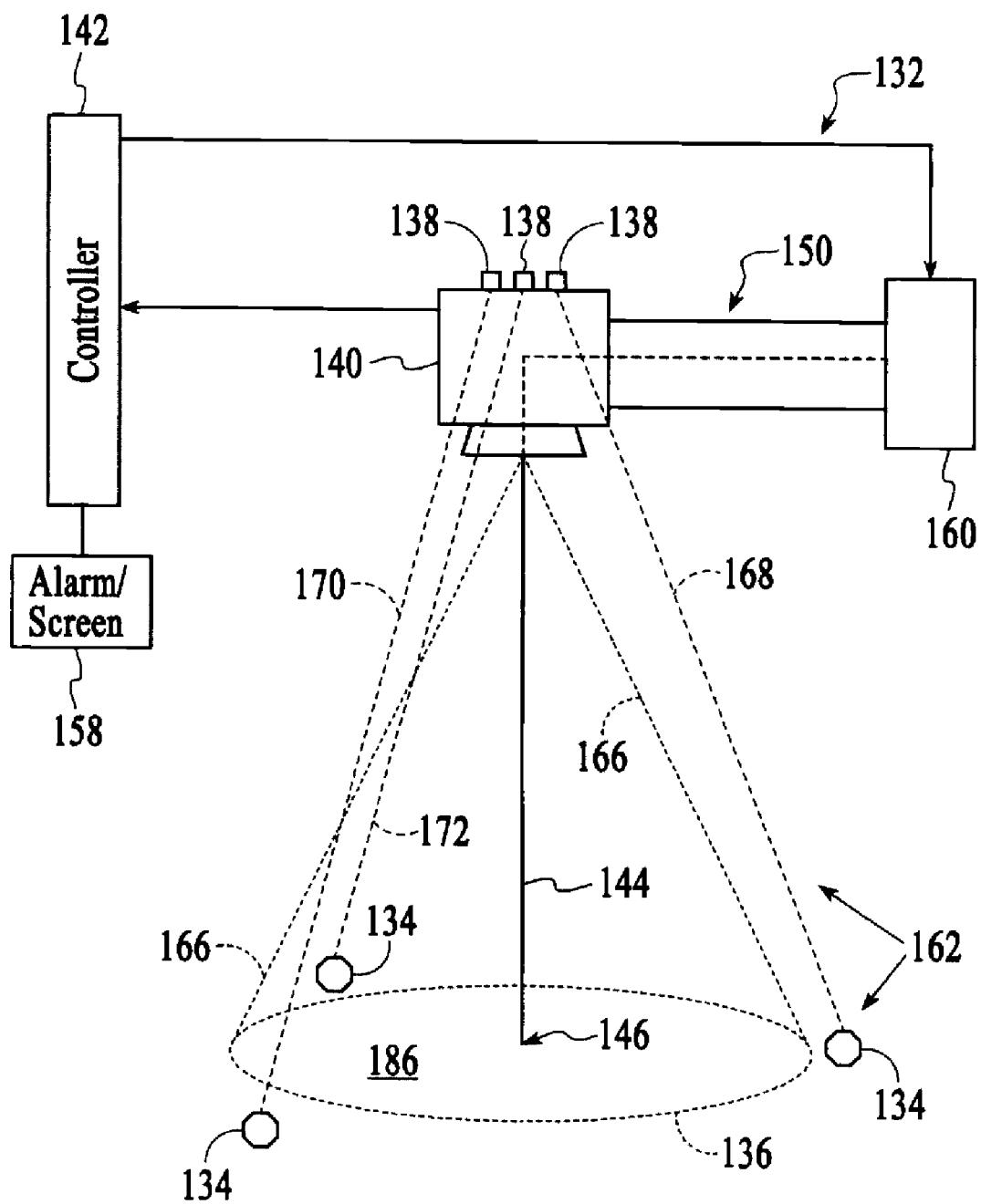
FIG. 15 is a side view schematic of a laser system for determining correctness of a laser beam direction depicting a general arrangement of the laser system's components according to an embodiment of the present invention.
Figure 16:
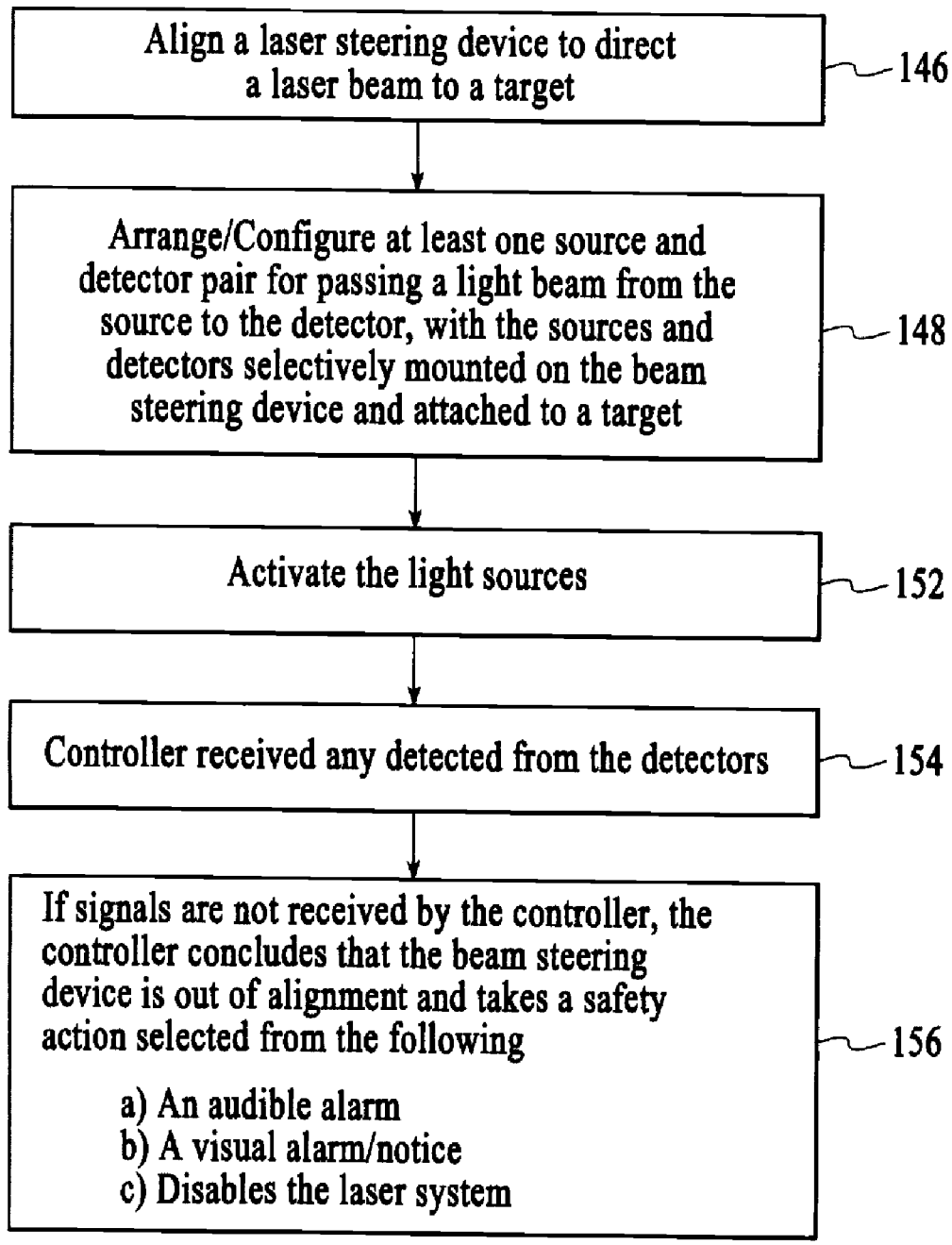
FIG. 16 is a flow chart describing a laser safety system wherein pairs of sources and detectors transmit a beam between a target and a beam steering device to provide a reference for beam alignment.

Referring now to FIG. 15, a laser safety system 132 is shown including at least one light signal source 134 attached to a target area 136, and corresponding light detectors 138 attached to a laser beam steering device 140. A controller 142 communicates with the detectors 138. According to a method of this embodiment, as illustrated in the flow chart of FIG. 16, the system of FIG. 15 is configured and operated by aligning the steering device 140 so that a laser beam 144 impinges accurately on a target point 146 (block 146). The sources 134 and detectors 138 are mounted and oriented so that light beams from the sources 134 strike the detectors 138 with the steering device oriented to place the beam as required on the target; for example at 146 (block 148). Prior to operating a laser source 140 to send the laser beam 144, the light sources are activated for example by the controller 142 (block 152). The controller 142 receives any signals incident on the detectors (block 154) and evaluates them. If a signal is not present from a detector, the controller determines that the beam steering device is not in proper alignment, and a safety action (block 156) if taken. An alarm or video/computer screen is indicated for this as item 158, or the system may be disabled.

Figure 18:
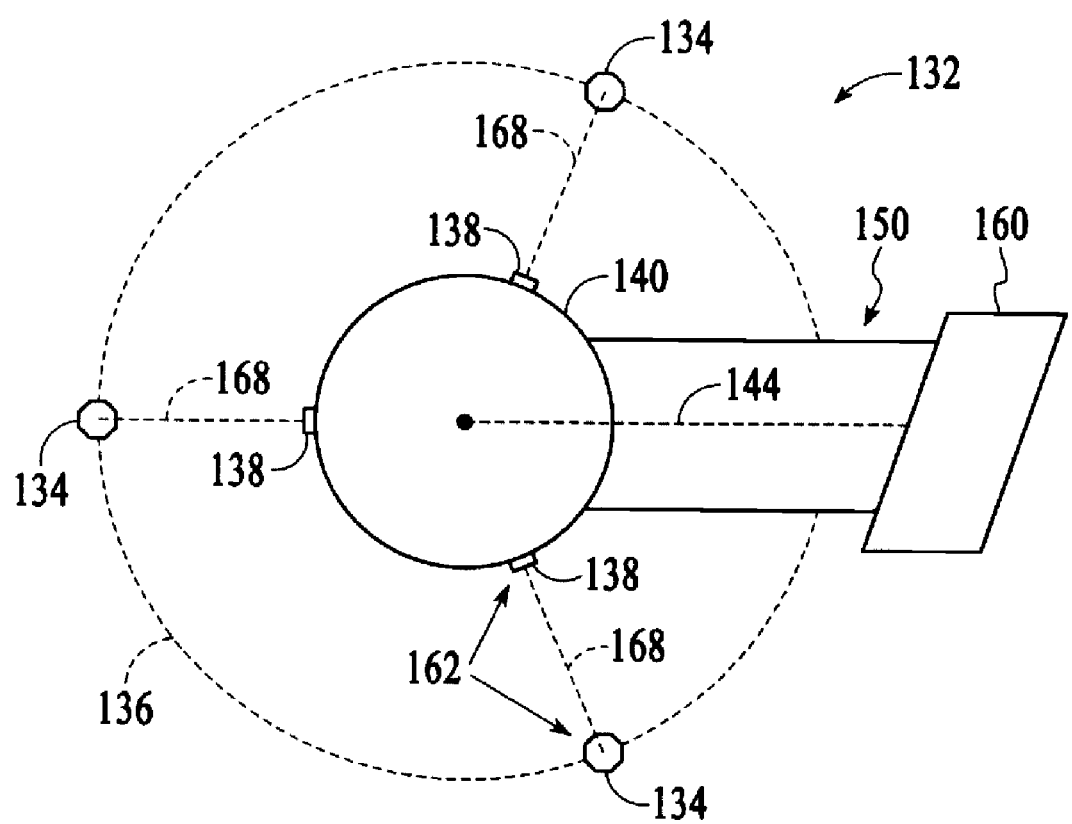
FIG. 18 is a plan view schematic of the laser system of FIG. 15 depicting the location and placement of signal sensors and signal sources.

Referring now again to FIG. 15, there is shown a laser system 160 and a beam alignment detection system ("detection system") 162. Laser system 160 may be any type of laser system employed in the art for processes such as cutting, welding, marking, scribing, trimming, annealing, milling, etching, drilling and stripping of materials as well as barcode reading, and distance measuring among many other possible applications. Typically, laser system 160 includes those laser systems mounted to a standard rack or rail system such as the Eclipse®, Sabre®, Zenith® or TLM series lasers produced by Telesis Technologies, Inc. of Circleville, Ohio, USA. Laser system 160 provides the laser beam 144, the beam steering device 140 and the work surface 136, as depicted in FIGS. 15 and 18.

Laser beam 144 may be any type of laser beam produced by laser system 160 that is directed through beam steering device 140, such as those produced by Nd Yag, CO2, solid state or Ytterbium laser systems, among others. Beam steering device 140 is typically a galvo scanner, but any other beam steering device or apparatus including, but not limited, to galvanometers, single mirror based steering devices (such as those that are actuated with piezoelectric elements), robotic arms, and gantry style devices may be utilized. Further, work surface 136 may be any surface upon which a component is placed for laser processing.

Figure 17:
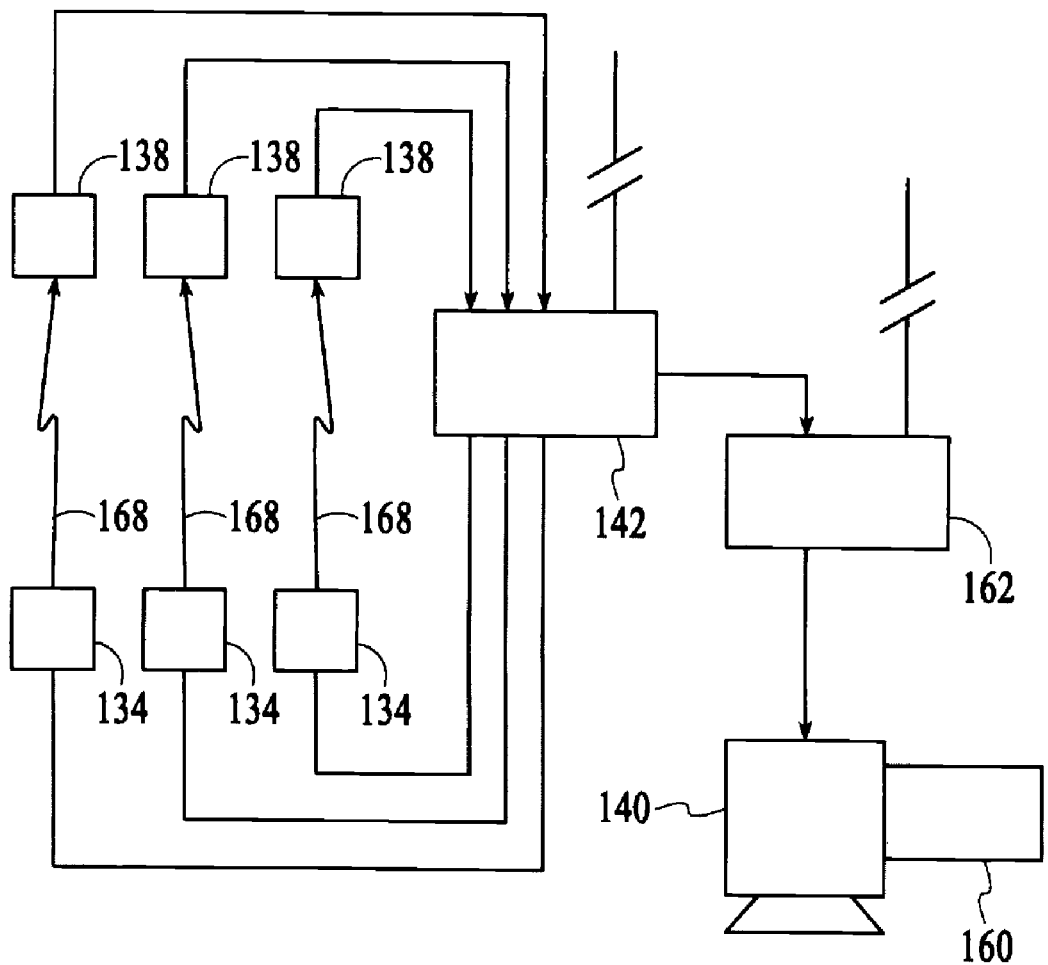
FIG. 17 is a block diagram depicting a signal sensor/signal source communication arrangement of a laser system according to an embodiment of the present invention.

Beam alignment detection system 162 may define a safety zone 166. The beam alignment system 162 includes a plurality of signal sources 134, a plurality of signal sensors 138 and a controller 142, as shown in FIGS. 15 and 17. Safety zone 166 includes a volume of space between beam steering device 140 and work surface 136 through which laser beam 144 passes during laser processing, as shown in FIG. 15. Safety zone 166 is generally conical in shape having its point near beam steering device 140 and its base along work surface 136, but may have a cylindrical, pyramidal or other geometry depending upon the characteristics of laser system 160. Safety zone 166 designates an area into which materials are to be placed for laser processing and within which laser beam 144 should be contained during laser processing. Further, containment of laser beam 144 within safety zone 166 may increase the safety of nearby equipment and personnel.

Signal sources 134 may be any light source including, but not limited to, laser diodes, LED's, lasers, incandescent lamps, infrared lamps, and light bulbs, among others. Other devices may be used such as sources of sound, ultra-sound, radio waves, or other forms of energy or signals so long as the individual signal 168 can be detected by the signal sensors 138, the source of the signal can be discriminated by the signal sensor, and where multiple signal sources 134 are used, the signals of each individual signal source can be distinguished by its respective signal sensor.

Signal sensors 138 may be any device that can detect the signal 168 of signal sources 134. Such sensors include photo diodes, phototransistors, and photocells, among others.

Controller 142 can be any means for receiving inputs from signal sensors 138 and determining from those inputs whether or not to enable or disable laser system 160. Controller 142 is typically a computer system having appropriate software and hardware for receiving input signals from sensors 138, determining whether the appropriate signal requirements are met (described in detail below) and controlling the enablement or disablement of laser system 160. In addition, or alternatively, controller 142 may include a human operator who completes one or more of the steps. A display device such as a display/screen 158 can also be utilized to provide an operator with a visual indicator of the signal sensor 138 inputs, such as a display having LED's which indicate the status of each signal sensor, among others.

The arrangement of the components of safety system 132 is described according to an embodiment of the present invention in reference to FIGS. 15, 17 and 18. A laser system 160 utilizing a galvo scanner beam steering device 140 is employed for laser processing. The laser system 160 is constructed to direct a laser beam onto a work surface 136. Beam steering device 140 steers the laser beam 144 from a path 150 to a path toward the work surface 136. The range of motion of the beam steering device 140 produces a conical shaped safety zone 166 between the beam steering device and work surface 136. Three signal sensors 138 and three signal sources 134 are shown. Signal sources 134 are arranged generally equidistant around the perimeter of safety zone 166 on work surface 136. Each signal sensor 138 is mounted to beam steering device 140 and aligned with a signal source 134. To align signal sensors 138 and signal sources 134, beam steering device 140 is first properly positioned over work surface 136 and oriented to correctly aim laser beam 144 at a desired target (not shown) on the work surface 136. Signal sources 134 and signal sensors 138 are then aligned such that each signal sensor detects a signal 168 only from its respective signal source, and each signal source is only detected by its respective signal sensor.

Three sets of signal sensors 138 and signal sources 134 is desirable because three points define a plane without ambiguity and therefore provide assurance that beam steering device 140 is aligned when each signal sensor detects its respective signal source. Greater than three sets of signal sensors 138 and signal sources 134 may be used, and in such case, may increase the alignment precision of beam steering device 140 as well as increase the margin of safety. Alternatively, fewer than three signal sensors 138 and signal sources 134 can be employed. In such a case the alignment of beam steering device 140 is only detected in the planes or directions defined by those signal sensors 138 and signal sources 134. This may be adequate in situations where other devices or apparatus provide accurate alignment of beam steering device 140 within safety zone 136 without ambiguity in those directions not detected by signal sensor 138/signal source 134 pairs.

With continued reference to FIGS. 15, 17 and 18, safety system 132 may disable laser system 160 until a safe alignment of beam steering device 140 is detected by detection system 162. To enable laser system 160, controller 142 must determine that all signal sensors 138 on beam steering device 140 are detecting signals 168 from all of their respective signal sources 134. If beam steering device 140 is out of proper alignment, then one or more signal sources 134 will not be detected by signal sensors 138, and laser system 160 will be disabled and rendered inoperable. If signal sensors 138 are able to detect all of their respective signal sources 134 simultaneously, then laser system 160 is enabled and laser beam 144 can be activated. This indicates that beam steering device 140 is correctly aligned and that laser beam 144 will be confined within the designated safety zone 166 where laser processing is to take place.

The embodiments depicted in FIGS. 15, 17 and 18 employ pairs of signal sensors 138 and signal sources 134 in which each signal sensor is aligned with, and detects a single, separate signal source. Other embodiments may use a single signal sensor 138 to detect one or more signal sources 134. This may be completed through the use of steering devices, steering mirrors, fiber optic cables or other devices (not shown) to direct the signal 168 about safety zone 166 and to signal sensor 138. Such an embodiment may also utilize this steering of signal 168 to further define safety zone 166 and to provide added safety measures against outside objects entering into the safety zone. Such embodiments may also increase the accuracy of the signal detection through the use of steering mirrors or fiber optics by increasing the precision required in orienting beam steering device 140 in order to detect signal 168.

Configurations in which signal sensors 138 are mounted to beam steering device 140 and signal sources 134 are mounted around safety zone 136 can be utilized as described above, but locations of the devices may be altered. For example, signal sources 134 may be mounted on beam steering device 140 and signal sensors 138 along safety zone 136 or a combination of signal sensors and signal sources may be mounted in either position.

Figure 20:
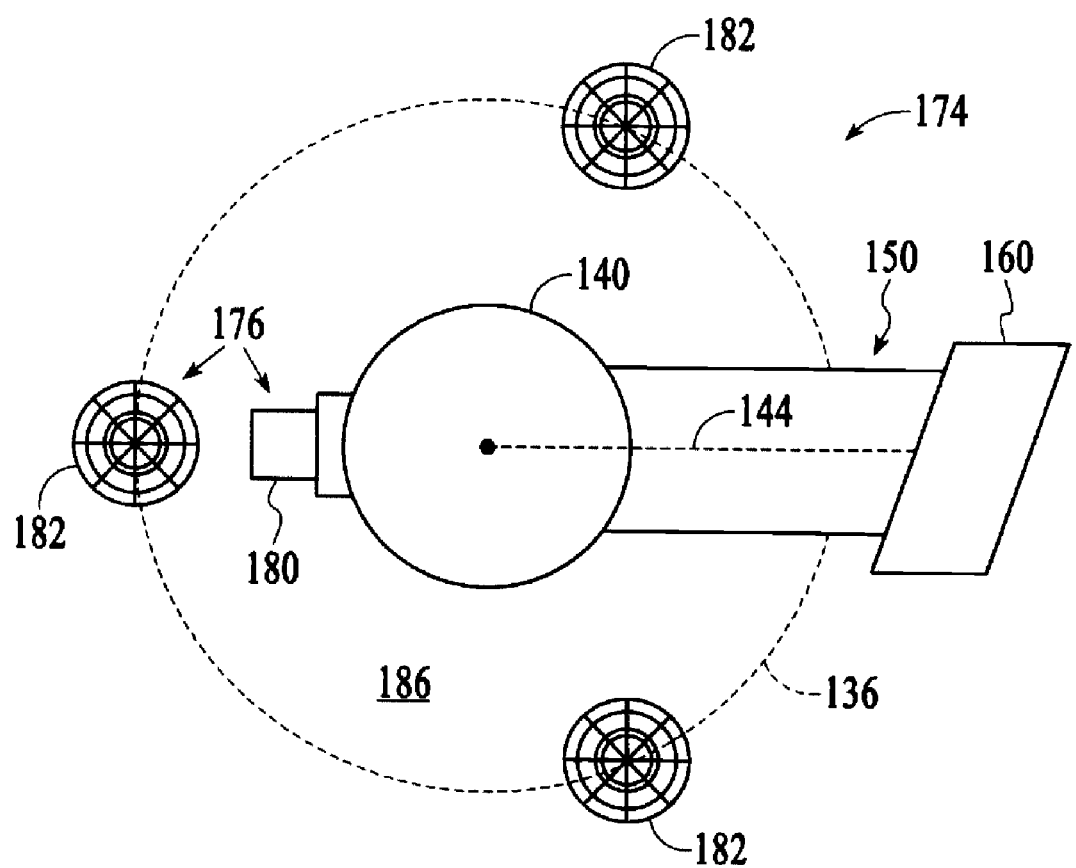
FIG. 20 is a plan view schematic of the laser system of FIG. 19 depicting the location of a camera and visual targets.

With reference now to FIGS. 19 and 20, a safety system 174 is depicted according to another embodiment of the present invention. Safety system 174 comprises laser system 160, as described previously and a beam alignment detection system ("detection system") 176. Detection system 176 further includes a controller 178 and a camera 180 and one or more visual targets 182. An alarm and/or monitor 184 is also shown for giving notice to a user of the system condition.

Camera 180 is any suitable type of camera including video, still, digital, film, color, or black and white, among others. The image captured by camera 180 may be recorded on any medium suitable to safety system 174 operation. This includes, but is not limited to, film, Polaroid, digital media including compact discs, digital video discs, memory cards, and computer memory, among others. In addition, the storage of initial and/or new images may not be required in some embodiments such as where a real-time image is only used to determine correct alignment of visual targets 182 within the image and is not compared to another image.

Visual targets 182 consist of any suitable material and design so long as the camera 180 is able to detect the targets, and the controller upon receiving the target image data from the camera is able to discern the targets 182 from the background in the image data and sufficiently determine the position of the targets 182 within the image data. Further, a work piece (not shown) may also function as a visual target 182 where adequate provisions are made to ensure proper placement and orientation of the work piece within safety zone 136.

Camera 180 is mounted to beam steering device 140, and visual targets 182 are mounted around or near safety zone 136.

Figure 21:
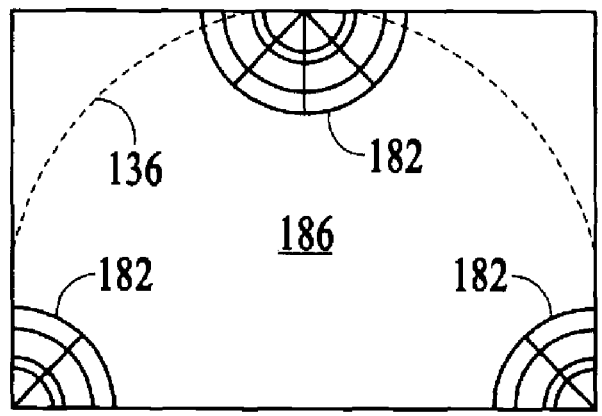
FIG. 21 is an example image depicting an image of visual targets that may be captured by the camera of the laser system of FIG. 19 indicating correct alignment of a beam steering device.

As depicted in FIGS. 19 and 20, in operation safety system 174 is useable to indicate proper alignment of beam steering device 140. An initial calibration image of visual targets 182 is captured by camera 180 when beam steering device 140 is correctly oriented to direct laser beam 144 within safety zone 136. A new test image is then captured by camera 180 prior to initiating a laser processing operation. The initial calibration image is then compared to the new test image. When the two images match within predefined margins for error, correct alignment of beam steering device 140 is indicated. The controller then enables laser system 160 and laser beam 144 may be safely activated. Exemplary images are provided in FIGS. 21-23.

In another embodiment, controller 178 utilizes a single image captured by camera 180 prior to commencing a laser processing operation to determine whether to enable or disable laser system 160. Controller 178 is programmed to recognize proper positioning of visual targets 182 within an image without comparing initial and new images thereby eliminating the need for capturing two separate images for the comparison.

Camera 180 and visual targets 182 may be used instead of, or in addition to, signal sensors 138 and signal sources 134. Further, camera 180 may be mounted on or near work surface 186, and visual targets 182 may be mounted on beam steering device 140. In another embodiment, multiple cameras 180 may be mounted on beam steering device 140 and/or on or near work surface 186 along with visual targets 182 mounted in either position.

The system of the present invention is usable with any beam steering device 32 or apparatus including but not limited to galvanometers, galvo scanners, single mirror based steering devices (such as those that are actuated with piezoelectric elements) and gantry style devices. Further, the present invention can be employed in any form of laser processing such as cutting, welding, marking, scribing, trimming, annealing, milling, etching, drilling and stripping of materials as well as barcode reading, and distance measuring among many other possible applications.

While this invention has been shown and described with respect to a detailed embodiment thereof, it will be understood by those skilled in the art that changes in form and detail thereof may be made without departing from the scope of the invention.

The invention claimed is:

1. A laser safety system comprising:
   a) at least one pair of elements including a detector and signal source;
   b) a controller;
   wherein in each pair, one of said elements is attached to a beam steering device and the other element to a system target area, and wherein said elements are aligned so that each said detector receives a signal from its corresponding signal source when said source is activated, wherein said alignment is performed when said beam steering device is acceptably aligned; and
   wherein said controller is configured to receive signal data from each of said detectors, and if said signal data is not received from said detectors when said sources are activated, said controller determines that said beam steering device is not in acceptable alignment and takes a safety action.

2. A system as recited in claim 1 wherein said sources are attached to said target area and said detectors are attached to said steering device.

3. A system as recited in claim 1 wherein said sources are attached to said beam steering device and said detectors are attached to said target area.

4. A method for enhancing safety of a laser system comprising:
   a) calibrating a laser system including
      i) first adjusting a beam steering device to correctly direct a laser beam of said laser system;
      ii) second adjusting a plurality of signal sources and detectors for transmitting and detecting a corresponding plurality of signals between a beam steering device and a target area of said laser system;
   b) testing for proper calibration prior to operation of a laser source of said laser system including
      i) activating said signal sources;
      ii) receiving by a controller signal input from said detectors;
      iii) determining by said controller if said signal input is consistent with proper alignment of said system; and
   c) taking a safety action by said controller if said system is determined by said controller to not be in proper alignment.

5. A method as recited in claim 4 wherein said safety action includes said controller giving notice that said system is not in proper alignment.

6. A method as recited in claim 4 wherein said safety action includes disabling said laser source.

7. A method for enhancing laser system safety comprising:
   a) calibrating a laser system including
      i) first adjusting a beam steering device to acceptably direct a laser beam;
      ii) capturing by a camera apparatus a calibration image of a pattern on a target area of said laser system, wherein said camera is attached to said beam steering device;
      iii) receiving calibration pattern image data by a controller from said camera;
   b) testing for proper calibration of beam steering device prior to activating a laser system laser source, said testing including
      i) capturing a test pattern image of said pattern image on said target area by said camera;
      ii) receiving by said controller test pattern image data from said camera;
      iii) determining by said controller if said test pattern image data is different from said calibration pattern image data by more than a predetermined allowable error; and
   c) taking a safety action by said controller if said test pattern image data is different from said calibration pattern image data by more than said predetermined allowable error.

8. A system as recited in claim 7 wherein said safety action is giving notice that the system is not in proper alignment.

9. A system as recited in claim 7 wherein said safety action is disabling said laser source.

* * * * *